(12) United States Patent
Grant et al.

(10) Patent No.: US 12,405,789 B2
(45) Date of Patent: Sep. 2, 2025

(54) LOAD CHUNK INSTRUCTION AND STORE CHUNK INSTRUCTION

(71) Applicant: Arm Limited, Cambridge (GB)

(72) Inventors: Alasdair Grant, Cambridge (GB); Stuart Robert Douglas Monteith, Cambridge (GB)

(73) Assignee: Arm Limited, Cambridge (GB)

( * ) Notice: Subject to any disclaimer, the term of this patent is extended or adjusted under 35 U.S.C. 154(b) by 31 days.

(21) Appl. No.: 18/260,972

(22) PCT Filed: Dec. 9, 2021

(86) PCT No.: PCT/GB2021/053218
§ 371 (c)(1),
(2) Date: Jul. 11, 2023

(87) PCT Pub. No.: WO2022/153024
PCT Pub. Date: Jul. 21, 2022

(65) Prior Publication Data
US 2024/0061682 A1 Feb. 22, 2024

(30) Foreign Application Priority Data
Jan. 15, 2021 (GB) .................................... 2100503

(51) Int. Cl.
*G06F 9/30* (2018.01)

(52) U.S. Cl.
CPC ...... *G06F 9/30043* (2013.01); *G06F 9/30112* (2013.01); *G06F 9/30145* (2013.01); *G06F 9/30181* (2013.01)

(58) Field of Classification Search
CPC .................................................. G06F 9/30043
See application file for complete search history.

(56) References Cited

U.S. PATENT DOCUMENTS 9,459,867 B2 10/2016 Bradbury et al.
2006/0253654 A1 11/2006 Adachi
(Continued)

FOREIGN PATENT DOCUMENTS

GB 2543303 A 4/2017

OTHER PUBLICATIONS

International Search Report and Written Opinion for an International Application No. PCT/GB2021/053218, dated Feb. 24, 2022.
(Continued)

*Primary Examiner* — Michael J Metzger
(74) *Attorney, Agent, or Firm* — NIXON & VANDERHYE P.C.

(57) ABSTRACT

Processing circuitry (16) and an instruction decoder (9) supports a load chunk instruction and a store chunk instruction which can be useful for implementing memory copy functions and other library functions for manipulating or comparing blocks of memory. Number of bytes to load or store in response to these instructions is determined based on an implementation specific condition. As well as loading or storing bytes of data, the load chunk instruction and (10) store chunk instruction also designated a load/store length value as data corresponding to an architecturally visible register, which provides an indication of a number of bytes loaded or stored.

25 Claims, 15 Drawing Sheets

(56) References Cited

U.S. PATENT DOCUMENTS

| | | | |
|---|---|---|---|
| 2007/0106883 A1 | 5/2007 | Choquette | |
| 2013/0246378 A1 | 9/2013 | Hearnden et al. | |
| 2014/0344489 A1* | 11/2014 | Kaminski | G06F 5/08 |
| | | | 710/56 |
| 2015/0120996 A1* | 4/2015 | Pokam | G06F 12/0815 |
| | | | 711/170 |
| 2015/0317164 A1 | 11/2015 | Laine et al. | |
| 2017/0139709 A1 | 5/2017 | Gschwind et al. | |
| 2018/0129437 A1* | 5/2018 | Belliard | G06F 12/1009 |
| 2018/0225116 A1* | 8/2018 | Henry | G06F 17/10 |
| 2020/0326940 A1 | 10/2020 | Guo et al. | |
| 2021/0096759 A1* | 4/2021 | Thakkilapati | G06F 3/0646 |

OTHER PUBLICATIONS

Examination Report for an International Application No. GB2100503.8, dated Jan. 23, 2023.
Combined Search and Examination Report for an International Application No. GB2100503.8, dated Oct. 22, 2021.
Robert Bedichek, "Some Efficient Architecture Simulation Techniques," Department of Computer Science, FR-35 University of Washington, Seattle, Washington 98195.
Jonathan Bradbury et al., "z13 Vector Extension Facility (SIMD)," Session 16897, Mar. 3, 2016.
Intel® 64 and IA-32 Architectures Software Developer's Manual, vol. 2B: Instruction Set Reference, M-U, Nov. 2020.
Power ISA™ Version 3.0 B, Chapter 3. Fixed-Point Facility, Mar. 29, 2017.
PowerPC™ 601 RISC, Microprocessor User's Manual.

* cited by examiner

LOAD CHUNK INSTRUCTION AND STORE CHUNK INSTRUCTION

The present technique relates to the field of data processing.

A data processing apparatus may perform data processing in response to instructions decoded by an instruction decoder. The instructions seen by the instruction decoder are defined according to the instruction set architecture supported by the apparatus, but may be generated based on compiling high-level code written by a programmer. High-level programming languages such as C include functions for moving data around in memory or comparing or scanning strings of data which can be apparently simple to call for the high-level programmer, but can be surprisingly difficult to implement in the compiled code that is actually seen by the processor. An example of such a function used in C is memcpy( ). memcpy( ) and other similar functions may be called frequently, representing up to 20% of the processing time of some applications.

At least some examples provide an apparatus comprising: an instruction decoder to decode instructions; and processing circuitry to perform data processing in response to the instructions decoded by the instruction decoder; in which: in response to the instruction decoder decoding a load chunk instruction specifying a source address, at least one architecturally visible load destination register, and an architecturally visible load length register, the processing circuitry is configured to: determine, based on at least one implementation-specific condition, a first number of bytes indicative of how many bytes of data to load from a memory system in response to the load chunk instruction; load data from a source block of memory system locations selected based on the source address and designate at least a portion of the loaded data as data corresponding to the at least one architecturally visible load destination register, the source block of memory system locations having a size corresponding to the first number of bytes; and designate a load length value as data corresponding to the architecturally visible load length register, the load length value indicative of a number of bytes which is less than or equal to the first number of bytes and which is also less than or equal to a number of bytes corresponding to a total size of the at least one architecturally visible load destination register; and in response to the instruction decoder decoding a store chunk instruction specifying a destination address, at least one architecturally visible store source register, and an architecturally visible store length register, the processing circuitry is configured to: determine, based on at least one implementation-specific condition, a second number of bytes indicative of how many bytes of data to store to the memory system in response to the store chunk instruction; store data, at least a portion of which is data designated as corresponding to the at least one architecturally visible store source register, to a destination block of memory system locations determined based on the destination address, the destination block of memory system locations having a size corresponding to the second number of bytes; and designate a store length value indicative of the second number of bytes as data corresponding to the architecturally visible store length register.

At least some examples provide a method comprising: in response to decoding of a load chunk instruction specifying a source address, at least one architecturally visible load destination register, and an architecturally visible load length register: determining, based on at least one implementation-specific condition, a first number of bytes indicative of how many bytes of data to load from a memory system in response to the load chunk instruction; loading data from a source block of memory system locations selected based on the source address, the source block of memory system locations having a size corresponding to the first number of bytes, and designating at least a portion of the loaded data as data corresponding to the at least one architecturally visible load destination register; and designating a load length value as data corresponding to the architecturally visible load length register, the load length value indicative of a number of bytes which is less than or equal to the first number of bytes and which is also less than or equal to a number of bytes corresponding to a total size of the at least one architecturally visible load destination register; and in response to decoding of a store chunk instruction specifying a destination address, at least one architecturally visible store source register, and an architecturally visible store length register: determining, based on at least one implementation-specific condition, a second number of bytes indicative of how many bytes of data to store to the memory system in response to the store chunk instruction; storing data, at least a portion of which is data designated as corresponding to the at least one architecturally visible store source register, to a destination block of memory system locations determined based on the destination address, the destination block of memory system locations having a size corresponding to the second number of bytes; and designating a store length value indicative of the second number of bytes as data corresponding to the architecturally visible store length register.

At least some examples provide a computer program to control a host data processing apparatus to provide an instruction execution environment for execution of target code; the computer program comprising: instruction decoding program logic to decode instructions of the target code to control the host data processing apparatus to perform data processing in response to the instructions of the target code, the instruction decoding program logic comprising: load chunk instruction decoding program logic to decode a load chunk instruction specifying a source address, at least one architecturally visible load destination register, and an architecturally visible load length register, and in response to the load chunk instruction to control the host data processing apparatus to: determine, based on at least one implementation-specific condition, a first number of bytes indicative of how many bytes to simulate as being loaded from a simulated memory system in response to the load chunk instruction; designate, as data corresponding to the at least one architecturally visible load destination register, at least a portion of data corresponding to a source block of simulated memory system locations selected based on the source address, the source block of memory system locations having a size corresponding to the first number of bytes; and designate, as data corresponding to the architecturally visible load length register, a load length value indicative of a number of bytes which is less than or equal to the first number of bytes and which is also less than or equal to a number of bytes corresponding to a total size of the at least one architecturally visible load destination register; and store chunk instruction decoding program logic to decode a store chunk instruction specifying a destination address, at least one architecturally visible store source register, and an architecturally visible store length register, and in response to the store chunk instruction to control the host data processing apparatus to: determine, based on at least one implementation-specific condition, a second number of bytes indicative of how many bytes of data to simulate as being stored to the simulated memory system in response to the store chunk instruction; simulate storing of data, at least a portion of which is data designated as corresponding to the at least one architecturally visible store source register, to a destination block of simulated memory system locations determined based on the destination address, the destination block of memory system locations having a size corresponding to the second number of bytes; and designate a store length value indicative of the second number of bytes as data corresponding to the architecturally visible store length register.

The computer program may be stored on a computer-readable storage medium. The storage medium may be a non-transitory storage medium.

Further aspects, features and advantages of the present technique will be apparent from the following description of examples, which is to be read in conjunction with the accompanying drawings, in which:

FIG. 1 schematically illustrates an example of a data processing apparatus;

LOAD AND STORE CHUNK INSTRUCTIONS

Figure 1:
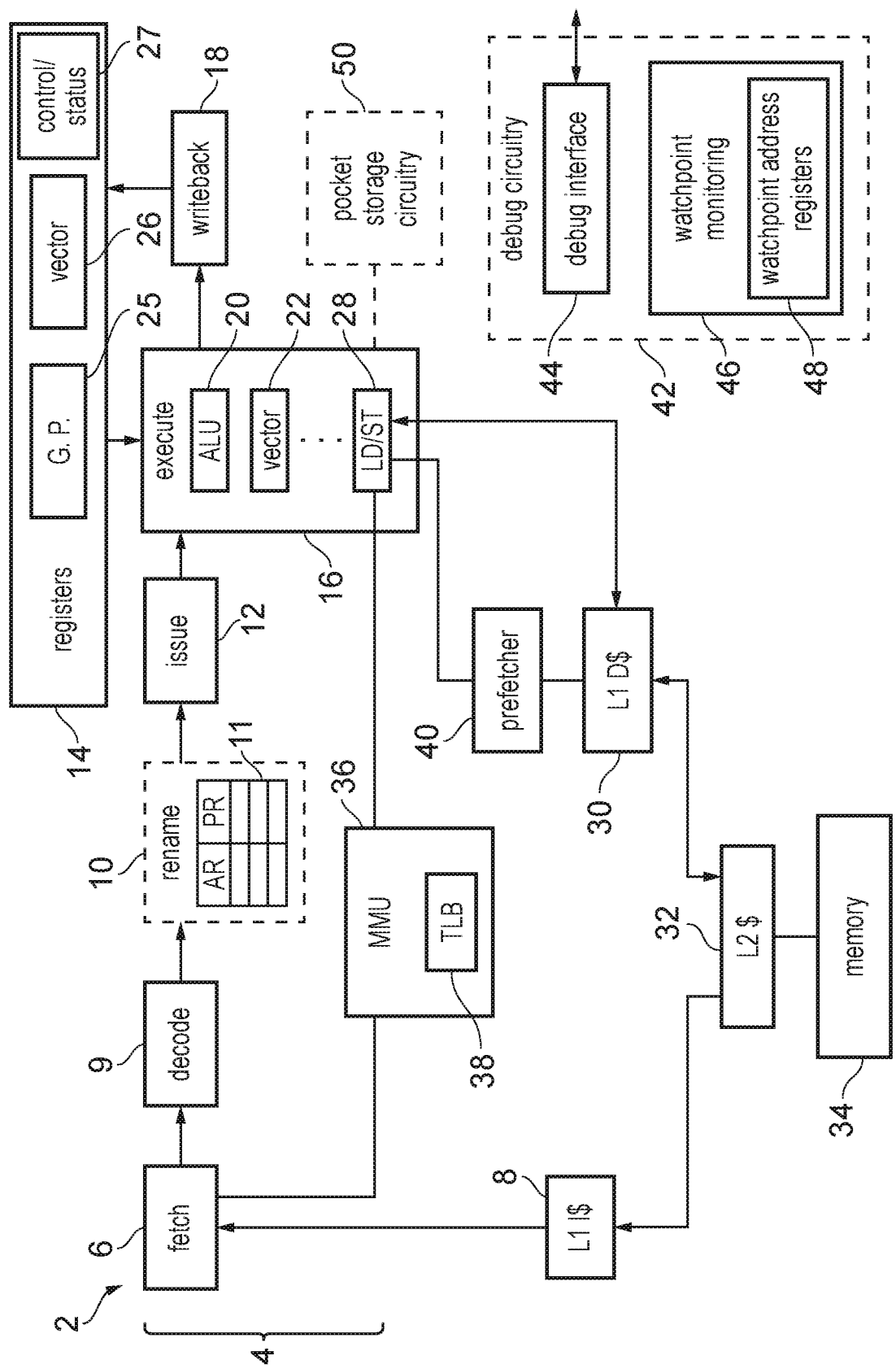

There can be a large overhead when copying data from one location in memory to another, comparing different blocks of memory, or scanning blocks of memory for a desired bit pattern, for example in response to a function such as the memcpy( ) function in C. Although memcpy( ) and similar functions may be relatively easy for a programmer to implement when writing high level code (e.g. in a programming language such as C), they can be significantly more difficult to implement efficiently in the compiled machine code seen by the instruction decoder of a processor, when considering the performance cost of executing the compiled code. This can be for a number of reasons. Limits to the maximum amount of data that can be transferred at a time mean that such functions may require multiple iterations of a load/store loop, each iteration loading or storing a chunk of the overall block of memory to be copied, compared or scanned. However, there may be multiple ways in which such a loop can be implemented with different choices for the number of bytes to copy, load or store in a particular iteration of the loop. Decisions on the how to efficiently implement functions such as memcpy( ) may depend on various parameters, such as the total number of bytes to copy, and the alignment of the copy start address relative to an address alignment boundary. In practice, this may mean that a compiled code section implementing a function such as memcpy( ) may start with a set of instructions implementing a "decision tree" for analysing this information (e.g. the above parameters) and deciding on an efficient approach to copying the data between the specified memory locations. This decision tree may often include many branches which are hard to predict by branch predictors (as they are data dependent, e.g. with the branch outcome depending on the particular parameters of the current memcpy( ) operation and varying from one instance of calling the memcpy( ) function to another), so can cause both a high degree in variability in performance and slow performance on average. Also, the most efficient way to handle a given memcpy( ) operation may depend on the micro-architecture of the particular data processing system executing the code, which can be difficult and/or slow to assess in software. Including micro-architecture-specific instruction sequences in software may prevent the same code being portable to different platforms with different micro-architectures, so that implementation of the memcpy( ) function may require significant development effort to support. However, with current architectural options, executing the same code across all micro-architectures may mean that the function runs inefficiently on some micro-architectures.

While memcpy( ) is given as an example above, the above issues do not only apply to the memcpy( ) function in C, but can also apply to other high-level code functions for copying data from one location in memory to another, or comparing strings or other chunks of data in two different memory locations, for example. Moreover, the above issues do not only apply to functions written in C. Indeed, these issues apply to any equivalent or similar functions in other programming languages too.

In the examples below an apparatus has an instruction decoder for decoding instructions, and processing circuitry to perform data processing in response to the instructions decoded by the instruction decoder. The instruction decoder and processing circuitry support processing of a load chunk instruction and a store chunk instruction.

The load chunk instruction specifies a source address, at least one architecturally visible load destination register, and an architecturally visible load length register. In response to the instruction decoder decoding the load chunk instruction, the processing circuitry: determines, based on at least one implementation-specific condition, a first number of bytes indicative of how many bytes of data to load from a memory system in response to the load chunk instruction; loads data from a source block of memory system locations selected based on the source address and designate at least a portion of the loaded data as data corresponding to the at least one architecturally visible load destination register, the source block of memory system locations having a size corresponding to the first number of bytes; and designates a load length value as data corresponding to the architecturally visible load length register, the load length value indicative of a number of bytes which is less than or equal to the first number of bytes and which is also less than or equal to a number of bytes corresponding to a total size of the at least one architecturally visible load destination register.

The store chunk instruction specifies a destination address, at least one architecturally visible store source register, and an architecturally visible store length register. In response to the instruction decoder decoding the store chunk instruction, the processing circuitry: determines, based on at least one implementation-specific condition, a second number of bytes indicative of how many bytes of data to store to the memory system in response to the store chunk instruction; stores data, at least a portion of which is data designated as corresponding to the at least one architecturally visible store source register, to a destination block of memory system locations determined based on the destination address, the destination block of memory system locations having a size corresponding to the second number of bytes; and designates a store length value indicative of the second number of bytes as data corresponding to the architecturally visible store length register.

The load chunk instruction and store chunk instruction are useful for improving performance when handling memory copies and comparisons such as in response to the C library functions such as memcpy( ), memset( ), etc. As the first and second numbers of bytes that are loaded/stored by the load/store chunk instruction respectively are determined based on at least one implementation-specific condition, the instruction set architecture does not constrain the particular number of bytes that are to be loaded/stored for a given set of operands of the load/store chunk instruction. The processor implementation has the freedom to vary the number of bytes loaded or stored depending on implementation-specific constraints. The implementation-specific condition may include any condition which is independent of the architectural state of the processing circuitry. The implementation-specific condition may include a condition which is independent of the instruction encoding of the load/store chunk instructions and independent of the operands defined for the load/store chunk instructions. The implementation-specific condition(s) used for the store chunk instruction could be the same as the implementation-specific condition(s) used for the load chunk instruction, or could be different.

In addition to considering at least one implementation-specific condition, the first or second numbers of bytes may also be determined based on at least one architecturally-defined condition, such as a parameter specified as an operand of the load or store chunk instruction or other architectural state of the processing circuitry. However, by considering at least one implementation-specific condition, this means the same instruction could generate different functional results when executed on different processing platforms having different micro-architectural implementations, so that performance can be improved because the particular implementation running the software may consider characteristics of that implementation such as address alignment, resource availability, etc. The processing circuitry or instruction decoder may also have the freedom to make moment-to-moment decisions on how many bytes to load or store in response to the load chunk instruction or store chunk instruction, e.g. to deal with temporary constraints on resource availability for example, and so even with exactly the same operands for a given instruction executed on a particular implementation, that individual processor implementation may itself vary the number of bytes loaded or stored in response to different instances of the load or store chunk instruction specifying the same operands.

This implementation-dependent variation of the number of bytes loaded or stored may be seen as counter intuitive since normally one would expect the functional result of an instruction to be defined in the instruction set architecture so as to provide a known result for a given set of operands. However, it is recognised that for memory copies and other similar functions, hardware limitations on the maximum amount of data that can be loaded, stored, copied or compared at a given time may mean that the operation may need to be split into an iterative loop which processes a chunk of the data in one iteration and then iterates through to repeat the processing for other chunks of data. Hence, in practice from the point of view of the high-level programmer, it does not matter exactly how many bytes are loaded or stored within an individual iteration of the loop—instead what may be more important is that the loop as a whole processes the required number of bytes. Therefore there is freedom to vary the number of bytes loaded or stored in an individual instance of executing the load/store chunk instructions, because the behaviour of subsequent instances could then be adjusted to account for the number of bytes loaded, so that eventually the overall block of data loaded or stored is correct. This flexibility can be exploited to enable performance improvements depending on implementation-specific conditions.

Also, the load and store chunk instructions designate a load length value or a store length value (as appropriate), which are designated as data corresponding to an architecturally visible register. This can provide an indication of how many bytes were loaded or stored which can be useful in subsequent instructions to allow decisions on how much data is still left to load or store, which can be useful for iterative loops which implement memory copies or other functions.

The load chunk instruction designates a load length value corresponding to an architectural visible load length register specified by the instruction. The load length value indicates a number of bytes which is less than or equal to the first number of bytes loaded in response to the instruction and which is also less than or equal to a number of bytes corresponding to a total size of at least one architectural visible load destination register to which the data loaded was designated. The load length value need not necessarily indicate the full number of bytes which were loaded in response to the load chunk instruction, because (as discussed further below with respect to examples which implement pocket storage circuitry), it is possible that the processing circuitry may load more data than is architecturally visible. However, by returning data in an architecturally visible register which provides a report giving some indication of an amount of data that was loaded, this allows the processing circuitry to adapt its behaviour for a subsequent instruction (e.g. store chunk instruction or other instruction) according to the number of bytes loaded, even if there is an interruption between the load chunk instruction and the subsequent instruction, again allowing for flexibility in implementation-specific decisions on how many bytes to load in each iteration.

Similarly, the store chunk instruction designates a store length value indicative of the second number of bytes which were stored to memory as data corresponding to an architecturally visible store length register specified in the instruction, and so this store length value can be used by subsequent instructions (such as in subsequent iterations of a loop) to determine how to continue processing any remaining chunks of data of an overall data structure.

Note that although the operation of a memory copy or other function may be regarded as a function, due to techniques such as loop unrolling, it is not essential that a branch follows each designated "iteration" of the memory copy loop, since loop unrolling may be used by a compiler to reduce the loop control overhead by compiling multiple iterations of a nominal "loop" into a single iteration of the compiled code. Hence, although the load/store chunk instructions are designed to support defining a loop for memory copying or similar functionality, it is not essential to actually use these instructions in a loop and sequential non-looping code could also benefit from these instructions.

Also, an advantage of the load/store chunk instructions is that sequences of code implementing a memory copy or similar function using the load/store chunk instructions are interruptible since even if an interrupt or exception occurs after the load chunk instruction but before execution of a subsequent instruction which will process its result, the fact that some of the loaded data for a load chunk instruction is designated as data corresponding to the at least one architecturally visible load destination register and the load length value is designated as data corresponding to the architecturally visible load length register means that state in architecturally visible registers is available representing the progress made in loading at least a portion of the overall data structure to be loaded, and so when processing resumes after the interrupt or exception has been handled then there is no need to repeat loading of the portion of data indicated as corresponding to the at least one architecturally visible load destination register. Hence, in contrast to approaches relying on hidden (not architecturally visible) state for tracking progress, this means that memory copies and other similar functions can be implemented using a sequence of code which is interruptible, can be single-stepped and does not tie up the processor for many processing cycles even if copying or processing large blocks of memory.

Also, the provision of separate load and store chunk instructions (at an architectural level at least) is useful because it may be simpler to implement in some processors which use a load-store architecture where data transfer instructions are normally memory-to-register or register-to-memory instructions. Nevertheless, as mentioned below some implementations may support fusing the load and store chunk instructions to perform them as a combined fused operation.

When data is designated as corresponding to a certain architecturally visible register, then in some instances of executing the load chunk instruction or store chunk instruction this may be implemented by actually storing the data to a storage location designated as that architecturally visible register. In some processor implementations, which particular storage location is designated as corresponding to a certain architectural register may vary from time to time, for example based on register renaming which may map the architecturally visible registers dynamically onto a larger pool of physical registers, with changes of register mapping occurring over time, so the location updated with the load/store length value may not always be the same. However, it may also be possible for data to be designated as corresponding to a certain architecturally visible register by outputting the data on a forwarding path which forwards the data for input as an input operand to a subsequent instruction which references that architecturally visible register for its source operand. In cases when forwarding of operands between instructions in this way is possible then it may be possible that the data designated as corresponding to the architecturally visible register may be consumed by a subsequent dependent instruction without ever having been stored to a register designated as representing that particular architecturally visible register. Hence, it will be appreciated that there may be a large number of ways in which data can be designated as corresponding to an architecturally visible register, and in general it is sufficient that data may be considered to correspond to an architecturally visible register if a subsequent instruction which specifies that architecturally visible register as a source operand may receive the data designated as corresponding to that register (if there is no intervening instruction which writes to that architecturally visible register).

The processing circuitry may permit the source address and the destination address to be unaligned with respect to an alignment boundary. In typical memory systems at least some of the hardware provided for controlling access to memory, such as caches, interconnects or memory controllers for example, may be constrained to access data in blocks of a certain size corresponding to a certain power of two number of bytes. Hence, if a load or store instruction requests an access to a portion of data greater than the alignment block size, which starts at an address unaligned with respect to the alignment boundary, then even if the total size of the data requested is less than or equal to the alignment block size, the load or store may need to be split into multiple memory transactions each to a block of data which does not cross an alignment boundary. The particular alignment block size may vary from processor implementation to implementation and may be a factor in the implementation-specific condition used to determine how many bytes to load/store. It can be useful for the processing circuitry to permit the load length value and store length value to indicate a number of bytes other than the power of two, so that it is possible on a given iteration of the load chunk instruction or the store chunk instruction to be architecturally observed as loading or storing a non-power of two number of bytes. By permitting unaligned source or destination addresses and non-power of two numbers of bytes reported by the load length value and store length value, this can be very useful for handling memory copies or other similar functions which may often be called to unaligned addresses and act on data structures of arbitrary sizes. This means that on one iteration of a loop, it can be useful to select a non-power of 2 number of bytes so that a following iteration can start loading/storing at an aligned address. However, as address alignment is an issue that varies from platform to platform, it can be useful to allow this to be determined in an implementation-specific manner by the processing hardware, rather than requiring specific software instructions to decide the preferred number of bytes to load/store.

The store chunk instruction may specify an architecturally visible source length register. In response to the store chunk instruction, the processing circuitry may constrain how many bytes of the portion of data designated as corresponding to the at least one architecturally visible store source register are to be stored to the destination block of memory system locations, to be less than or equal to a number of bytes indicated by a source length value designated as corresponding to the architecturally visible source length register. This is useful because it allows the store chunk instruction to follow an earlier load chunk instruction, with the architecturally visible source length register of the store chunk instruction specified to correspond with the architecturally visible load length register of the load chunk instruction, so that the store chunk instruction can be controlled to store to memory no more bytes than were loaded in response to the load chunk instruction. This again helps give flexibility for the load chunk instruction to cause the processing circuitry to load fewer bytes on some instances of execution than on others to account for any implementation-specific constraints, since the processing circuitry can then adapt the actions taken in response to the store chunk instruction, to account for any limit imposed on the number of bytes loaded by the load chunk instruction.

In some examples, the processing circuitry may allow the second number of bytes to be less than the number of bytes specified by the source length value. Although the second number of bytes which are stored to memory in response to the store chunk instruction is constrained based on the value in the architecturally visible source length register, nevertheless the store chunk instruction can be allowed to store to memory a second number of bytes which is less than the number of bytes specified by the source length value. This allows implementation-specific constraints to be considered where, even if the store chunk instruction follows an earlier load chunk instruction which loaded a relatively large number of bytes, the store chunk instruction may cause the processing circuitry for a given instance of execution to store fewer than the number of bytes that were loaded by the load, for example if that is preferred due to address alignment conditions or other implementation-specific constraints.

As mentioned below in the discussion of device type memory, this feature is not essential. Other examples could constrain how many bytes of the portion of data designated as corresponding to the at least one architecturally visible store source register are to be stored to the destination block of memory system locations, to be equal to a number of bytes indicated by the source length value designated as corresponding to the architecturally visible source length register. This does not exclude the option to also store additional bytes of data other than the data designated as corresponding to the at least one architecturally visible store source register (e.g. based on data obtained from a pocket storage region as discussed below).

Some implementations of the store chunk instruction may specify two separate architecturally visible registers as the architecturally visible source length register and the architecturally visible store length register respectively. However, in other examples the source length register and the store length register may both correspond to the same architectural register number. This can save instruction encoding space by allowing a single register specifier in the instruction encoding to specify the register to use for both purposes. Although the architecturally visible source length register and store length register both correspond to the same architectural register number, they may nevertheless correspond to different physical registers. Some systems may support register renaming so that it is possible that the common architectural register number used for both registers is remapped by register renaming circuitry in response to the store chunk instruction so that the store length value is written to a different physical register to the physical register storing the source length value which is used as an input to the store chunk instruction. Nevertheless, from the point of view of architecturally visible state, if both source length register and store length register correspond to the same architectural register number then the store chunk instruction can be seen as overwriting the source length value with the store length value.

The functions of the load chunk instruction and store chunk instruction may be as discussed above, at least if the load chunk instruction and store chunk instruction are separately executed as separate non-fused operations. The load chunk instruction and store chunk instruction may also be used independently, since some library functions may benefit from using only one of the load chunk instruction or store chunk instruction in combination with other instructions. Also, sometimes after executing a load chunk instruction in a sequence also including the store chunk instruction, it may be possible that an exception occurs before the store chunk instruction is reached and in that case then the architecturally visible state seen after the load chunk instruction may include the data designated as corresponding to the architecturally visible load destination register and the load length value designated as corresponding to the load length register.

However, some implementations may support instruction fusion where, in response to the instruction decoder decoding a sequence of instructions which includes the load chunk instruction followed by a dependent store chunk instruction (for which the architecturally visible source length register corresponds to the architecturally visible load length register of the previous load chunk instruction and the at least one architecturally visible store source register corresponds to the at least one architecturally visible load destination register of the earlier load chunk instruction), then the processing circuitry may perform a fused operation which may not be the same as the sum of all the operations which would be performed if the load chunk instruction and store chunk instruction were executed separately, but may give a functionally equivalent result (at least if an assumption is made that state set by the load chunk instruction which is used as a source operand by the store chunk instruction does not need to be preserved for use by subsequent instructions).

In the fused operation performed in response to detecting the sequence of the load chunk instruction and the dependent store chunk instruction, the processing circuitry may copy a given number of bytes of data from a first block of memory system locations identified based on the source address to a second block of memory system locations selected based on the destination address, with the given number of bytes selected based on at least one implementation-specific condition, and the processing circuitry may designate a value indicative of the given number of bytes as data corresponding to the architecturally visible store length register specified by the store chunk instruction. For example the given number of bytes may be selected based on both the source address and the destination address and on at least one implementation-specific condition. Such implementation-specific condition(s) could include a combination of the implementation-specific conditions which would have been used to determine the first and second numbers of bytes in response to separately executed instances of the load chunk instruction and store chunk instruction. It is not essential for the fused operation to perform all of the actions which would have been performed if the load chunk instruction and store chunk instruction were executed separately. For example, operations for passing operands between the load chunk instruction and the store chunk instruction, such as designating the load length value as data corresponding to the architecturally visible load length register, could be omitted when the two instructions are processed as a fused operation, since it may be expected that the load length value becomes redundant once the store operation has been performed. Similarly, with the fused operation it may not be essential to actually make data loaded from memory be designated as corresponding to at least one architecturally visible load destination register, since when a fused operation is performed it may be possible instead to copy data from the first block of memory system locations to the second block of memory system locations either directly or via a microarchitectural storage structure, without being designated as data for an intervening register.

The load length value reported by the load chunk instruction may be allowed to specify a number of bytes which is less than the actual first number of bytes loaded from memory in response to the load chunk instruction. This is useful to support some processor implementations choosing to load additional bytes (other than the number of bytes indicated as corresponding to the architecturally visible load destination register(s)) into hidden storage whose contents are not visible architecturally. Hence, the load length value designated as corresponding to the load length register may be indicative of the number of bytes in the portion of the loaded data which is designated as corresponding to the at least one architecturally visible load destination register. This approach is useful for allowing code to be portable between different processor implementations since relatively small, low power, implementations may choose not to load any additional hidden storage whereas a more powerful processor core may support the extra hidden storage so that the load can load more data. As the load length value does not take account of data loaded to storage other than the at least one architecturally visible load destination register, then even if the code is migrated onto a smaller processor core not having that hidden storage then the subsequent store chunk instruction or other instruction which uses the load length value can still function correctly.

Hence, in some implementations in response to the load chunk instruction the processing circuitry may support loading, to a pocket storage region, at least one byte of data loaded from the source block of memory system locations other than the portion designated as corresponding to the at least one architecturally visible load destination register. This further portion of data loaded to the pocket storage region may be architecturally hidden data which is not designated as corresponding to any architecturally visible register. The data in the pocket storage region may be allowed to be discarded. In response to the store chunk instruction the processing circuitry may support storing at least one byte of data, other than the portion designated as corresponding to the at least one architecturally visible store source register, from the pocket storage region to the destination block of memory system locations. Hence, some implementations may load/store more data than is architecturally observed in the load destination register and reported using the load length value, but by hiding this additional loading/storing from the architecturally visible state provided after the load chunk instruction, this avoids the need for smaller processor implementations to support the ability to handle such larger load or store operations in one instruction, improving flexibility of support for different implementations.

In some implementations, the decision on what data to load to or store from data designated as corresponding to an architecturally visible register may be made separately from a decision of what further data (if any) should be loaded to or stored from the pocket storage region. Hence, in some implementations the first number of bytes (which includes both the data loaded corresponding to an architecturally visible register and the data in the pocket if available) may not be explicitly indicated as a data value equal to the first number, but could also be represented in an equivalent fashion by indicating the number of bytes loaded as corresponding to the architecturally visible load destination register (as indicated in the load length value) and providing a separate indication of the number of further bytes loaded to the pocket storage region (e.g. as part of pocket validity information as mentioned below). Hence it is not necessary that the first number of bytes is explicitly evaluated.

If at least one byte of data is loaded to the pocket storage region in response to the load chunk instruction, the processing circuitry sets the load length value with the at least one byte loaded to the pocket storage region excluded from the first number of bytes indicated using the load length value. In contrast, for the store chunk instruction the at least one byte of data stored from the pocket storage region to memory would be included within the second number of bytes indicated using the store length value, to inform subsequent instructions that it is not necessary to repeat loading or storing of those bytes.

In response to the load chunk instruction, when at least one byte is loaded to the pocket storage region, the processing circuitry may (at least when processing the load chunk instruction individually rather than as a fused operation) set validity information indicative of validity of the at least one byte loaded to the pocket storage region in response to the load chunk instruction. In response to the store chunk instruction the processing circuitry can then determine, based on the validity information, whether to store to the destination block of memory system locations any valid bytes of data read from the pocket storage region. Note that even if the validity information specifies that there are some valid bytes of data which could be stored to memory, the processing circuitry does not necessarily need to store those bytes to memory in response to the store chunk instruction, since implementation-specific conditions or other architectural constraints may mean it is better for performance reasons not to store all of the valid bytes that are available. The validity information may be architecturally hidden state which is not accessible in a designated architectural register.

The validity information may be cleared at any point. For example, the processing circuitry may clear or invalidate the validity information in response to an exception, and/or in response to processing of a store chunk instruction or other instruction which is capable of causing the processing circuitry to consume at least one valid byte of data read from the pocket storage region. It may be useful on exceptions to clear the validity information as the exception may trigger an exception handling routine to execute between processing of the load chunk instruction and processing of any subsequent store chunk instruction or other instruction which would consume bytes of data read from the pocket storage region, and there may be a risk that the exception handler may itself use the pocket storage region for other purposes, so it may be desirable to clear the validity information in response to the exception to ensure that on returning from the exception the subsequent store chunk instruction or other instruction will not store incorrect bytes of data to memory. If a store chunk instruction executes following clearing of the validity information then from the point of view of the store chunk instruction it is as if the load chunk instruction never loaded those bytes of data to the pocket storage region, and the store chunk instruction may then store the bytes designated as corresponding to the architecturally visible store source register(s). Also, validity information may be cleared when data is actually consumed from the pocket storage region to ensure that a subsequent instruction does not inadvertently consume data that has already been consumed by an earlier instruction. Note that even if the store chunk instruction or other instruction does not consume all of the valid bytes indicated in the pocket storage region, in some cases the validity information may still be cleared to indicate that there are no valid bytes of data left.

If the pocket storage region is supported, then one constraint on loading of data to the pocket storage region based on architecturally-defined information, which may not explicitly be indicated in the encoding of the load chunk instruction itself, may be to consider one or more protection attributes which may be associated with a memory region including the source address specified by the load chunk instruction. If the protection attribute specifies that the memory region associated with the source address is a device type of memory region (for which repeating a same memory access multiple times risks causing a side effect different from an effect caused when that memory access is only performed once), then the processing circuitry may, in response to the load chunk instruction, prevent data being loaded to the pocket storage region.

For normal memory which simply provides data storage, there may be no side effect associated with reading the same memory location multiple times, since each time the same data may simply be returned with the same value. However, some memory regions may be designated as device type memory which can be useful for controlling peripheral devices or for controlling access to a buffer structure used to queue commands. For example, a read to an address may trigger an action such as execution of a particular command represented by that read. If the access is repeated, this can lead to the command being performed twice instead of once, which can sometimes have undesirable side effects visible externally by the user of the processing system. In implementations which use the pocket storage region a discussed above, if the store chunk instruction stores fewer bytes to memory than were loaded to the pocket storage region by the corresponding load chunk instruction, there is a risk that the subsequent iteration of a load/store loop defined to implement a memory copy function may cause a subsequent load chunk instruction to re-load bytes of data which were already read in the previous iteration, risking causing a side effect if the read data is from a device type of memory region. To prevent this, the processing circuitry may prevent bytes of data being loaded to the pocket storage region when it is determined that the protection attribute for the region including the source address specifies that the region is a device type of memory region.

A similar issue could arise even if the pocket is not used. For example, a load chunk instruction could re-read data that a previous load chunk instruction loaded to the architecturally visible register, in the case where the processing circuitry determines for an intervening store chunk instruction that not all of the bytes loaded in response to the previous load chunk instruction should be stored. If it is desirable to provide protection against such repeated reads to device memory, then a number of options are available:

- in some examples, the store chunk instruction could be required to store at least the loaded architecturally-visible data (or none at all if trapped, in which case it would be retried), so only the additional pocket data (if implemented) may be partially stored from among the load data loaded by an earlier load chunk instruction. In this case, the second number of bytes would be constrained to be, at a minimum, the number of bytes specified by the source length value (unlike the example above which allows the second number to be less than the number of bytes specified by the source length value). Nevertheless, the second number of bytes could still be less than the total number of bytes loaded by an earlier load chunk instruction, in cases where the pocket is supported.
- a store chunk instruction could cause the processing circuitry to retain (in a buffer or other micro-architecturally implemented storage) the unstored part of the data corresponding to the at least one architecturally visible store source register together with an indicator of the unstored length of data, that would allow the store to be iterated to completion to ensure all data previously loaded by an earlier load chunk instruction is stored to memory before proceeding to a next load chunk instruction.

It will be appreciated that neither of these options is essential. In practice, it may be considered unlikely that these instructions would be used in conjunction with device type memory, since the memory-copying primitives or other library functions for which these instructions may be used may not have well-defined behaviour for device memory anyway, and so are very unlikely to be called specifying addresses mapped to device memory. Therefore, it is not essential to implement any protection against repeated loads to device memory resulting from only part of the previously loaded data being stored in response to the store chunk instruction.

Nevertheless, in some examples where protection to support calling the functions to device type memory is desired, at least one of the load chunk instruction or the store chunk instruction may cause the processing circuitry to behave differently depending on whether or not the source address of a load chunk instruction is mapped to device type memory. In the case that the different behaviour affects the store chunk instruction, this may be controlled by the processing circuitry based on information recorded in response to the load chunk instruction (e.g. this information could identify the source address of the load chunk instruction, or an indication of whether the source address is mapped to device memory). The different behaviour could be the selection of whether to use the pocket, or could be control of whether the store chunk instruction is allowed to partially store the architecturally visible data from the architecturally visible store source register, for example.

In implementations which use the pocket storage region, the size and/or available storage capacity of the pocket storage region may be factors in evaluating the implementation-specific condition used to determine the first or second number of bytes to be loaded or stored in response to the load and store chunk instructions respectively. The size of the pocket storage region may vary from implementation to implementation.

In some implementations, in response to the load chunk instruction, the processing circuitry may record source information which is indicative of the source address. In response to the store chunk instruction, the processing circuitry may exclude the data in the pocket storage region from the second number of bytes to be stored to memory in response to the store chunk instruction, when it is determined that an aliasing condition is satisfied by the destination address and the source address indicated by the source information. For example, the aliasing condition may be a condition satisfied if the processing circuitry determines based on the source information and the destination address that there is a risk that some of the data previously loaded to the pocket storage region in response to a load chunk instruction was loaded from addresses which match some of the addresses associated with the destination block of memory system locations to which data would be stored in response to the store chunk instruction in the event that bytes were stored to memory from the pocket storage region. Checking for this aliasing condition can be useful to reduce the variation between the results of load chunk/store chunk loop executed on different implementations implementing different sizes of pocket storage region. By falling back to not using data stored in the pocket in cases where aliasing is possible then this may improve repeatability of the results of processing a load chunk/store chunk loop on implementations with different pocket sizes.

The pocket storage region may be implemented in a number of different ways if provided for a given system implementation. Different implementations may choose different options. For example the pocket storage region could be a dedicated buffer provided in hardware, one or more physical hardware registers, a linefill buffer associated with a cache, or some storage located in the memory system fabric, for example within an interconnect used to couple multiple master devices or processor cores which may issue memory transactions. In other examples, the pocket storage region could be implemented using a portion of a register bank which is not currently being used. For example, in a system having vector registers for storing vector operands which may be processed in a single instruction multiple data (SIMD) fashion involving multiple independent data elements stored within the same register, the vector registers may only be used by some portions of software, and there may be other portions of software which do not use the vector registers. Hence, if available the vector register storage capacity can be used to provide the pocket storage region. Another option is that a certain region of the memory address space (selected on an implementation-specific basis) may be designated as corresponding to the pocket storage region.

One example of an implementation specific condition, used to derive the first or second number of bytes to be loaded or stored in response to the load or store chunk instructions, may be an address alignment condition which depends on relative alignment of the source address or the destination address with respect to an alignment boundary. For example, the first or second number of bytes may be selected so that the source or destination block of memory system locations will not cross an alignment boundary. This can be useful in a load/store chunk loop to ensure that the source or destination address for the next iteration will be aligned to the boundary. Note that the source address and the destination address may be differently aligned with respect to alignment boundaries, so that a number of bytes which would take the source address to the next alignment boundary may be different to the number of bytes needed to adjust the destination address to align to an alignment boundary, and so it can be useful for the processing circuitry to support the option of making separate decisions on the first and second number of bytes depending on the relative alignment of the source address (for the load chunk instruction), or the destination address (for the store chunk instruction). In the event that the load and store chunk instructions are processed as a fused operation then a combined decision of the number of bytes to copy can be made based on both source and destination address alignment. The particular alignment conditions may vary from implementation to implementation depending on the particular implementation of their memory access hardware.

Other implementation-specific conditions can include factors such as resource availability (e.g. current load or store buffer occupancy).

There may also be some constraints on the determination of the first or second number of bytes based on architecturally defined information. For example, in one example the load chunk instruction may specify a source limit value which indicates a maximum limit for the first number of bytes. In this case, the first number of bytes may be determined based on both an implementation specific condition and the source limit value. Similarly, the store chunk instruction could limit the second number of bytes to a maximum indicated by a destination limit value specified by the store chunk instruction, in addition to applying any implementation-specific conditions. The source and destination limit values can be useful to ensure that in a load/store chunk loop the load/store chunk operations do not extend beyond a certain end point representing the end of the data structures to be copied. The source and destination limit values could be encoded in different ways. For example the limit values could be defined as a number of bytes, or as an address marking the limit of the data structure to be loaded or stored (in practice, an offset value may effectively indicate both the number of bytes and the address if the address is defined relative to the source/destination address). In some cases, the instruction set architecture could support the source or destination limit value being set to a predetermined value (e.g. zero) which encodes that there is no maximum specified by the source or destination limit value itself, although even if the source destination value takes the default predetermined value indicating there is no limit then there may still be other constraints which limit the determination of the first/second number of bits based on other architectural constraints and/or implementation-specific conditions.

In implementations where the load chunk instruction specifies a source limit value, this can be useful for controlling prefetching of data. In response to the load chunk instruction, the processing circuitry may prefetch, into a data cache, data associated with a further block of memory system locations other than the source block of memory system locations. The further block of memory system locations which is prefetched may be selected based on the source limit value. This exploits the fact that, even if it is determined based on address alignment or other conditions that only the first number of bytes should e loaded, the source limit value may provide a hint as to what further data will be loaded in subsequent iterations of a load/store chunk loop, and so this can be exploited by a prefetcher which may use the hint to determine to prefetch into a data cache some of that further data expected to be loaded soon, so that when a subsequent iteration of a load chunk instruction actually requests access to that data then the delay in accessing this data from the memory system can be reduced.

In another example, the first/second number of bytes loaded or stored may be constrained based on protection information (another example of architecturally defined information which may limit the number of bytes loaded/stored). Memory access control circuitry may control access to memory based on protection information defined in a protection table which comprises a number of protection entries associated with respective memory regions. For example the protection information may specify address translation information for translating virtual addresses in the associated memory regions into physical addresses, or could specify memory attributes which define permissions for accessing the memory region (e.g. whether the region is read only or read/write). Other examples of protection information may specify a security domain associated with a memory region which can be used to control which software processes are allowed to access the memory region.

In response to the load chunk instruction, the processing circuitry may limit the first number of bytes to prevent the source block of memory system locations crossing a protection boundary between memory regions associated with different protection entries. In response to the store chunk instruction the processing circuitry may limit the second number of bytes to prevent the destination block of memory system locations crossing a protection boundary. This avoids memory protection faults arising associated with an address other than the source/destination address itself, which could otherwise occur if the load/store chunk instructions were allowed to stray beyond a protection boundary into a next memory region which may not have a protection entry defined or may have different protection attributes set compared to the attributes for the region including the source/destination address. Handling of memory protection faults may be simpler if it is associated with the source or destination address itself. Also, this approach means that the number of protection lookups needed for the load/store chunk instructions can be limited to one memory region per load/store chunk instruction, which also simplifies implementation of memory management circuitry for looking up the protection entries.

Another architectural feature may be support for watchpoints, which may be useful for diagnostic purposes. Watchpoint monitoring circuitry may signal an exception when a target address of a memory access requested by the processing circuitry corresponds to a defined watchpoint address (or one of a number of defined watchpoint addresses). For example, a person performing debugging of software executing on the processing circuitry may wish to interrupt the processing at the point when the processing circuitry accesses a certain address in memory. This address may be defined as a watchpoint address. When the watchpoint monitoring circuitry detects the access to the address defined as a watchpoint address, the exception is triggered and this may cause a debugger to intervene and perform a diagnostic action, such as examining contents of certain registers, or causing the processing circuitry to execute one or more intervening debug instructions before returning to the original processing of the software that was being debugged. This can be helpful for software development. Again, for similar reasons to the memory protection faults, it can be undesirable for the watchpoint fault to occur at an address partway through the block of memory system locations being loaded or stored in response to the load or store chunk instructions, and so it may be preferable that in cases where the source or destination address is not the watchpoint address, the processing circuitry limits the first or second numbers of bytes to prevent the source or destination block of memory system locations crossing the watchpoint address.

In some implementations, the store chunk instruction may be architecturally defined as requiring, as its architecturally visible result, that a predetermined value is designated as data corresponding to the at least one architecturally visible store source register which was used to provide at least a portion of the bytes of data to be stored to memory in response to the store chunk instruction. This can be seen as counterintuitive as it may not be immediately apparent why clearing the architecturally visible store source register to a predetermined value would be useful, when in practice the store source register only provides the data to be stored to memory rather than being used as any desired output of the store chunk instruction.

However, as mentioned above, some processor implementations may choose to implement the load and store chunk instructions as a fused operation, if detected as a dependent pair within an instruction sequence, and in that case the fused operation could be processed without necessarily implementing all the actions to the load chunk instruction if executed individually. If the data designated as corresponding to the at least one architecturally visible store source register is retained in an architecturally visible manner after processing the store chunk instruction, there would be a risk that some software may be written or compiled so that a subsequent instruction assumes that the data provided as a source operand to the store chunk instruction will still be accessible after the store chunk instruction has been processed. This can make it more complex to support the fused operation in implementations which support that instruction fusion, as it may mean that (even though for the purposes of processing the load chunk instruction and the store chunk instruction in the fused manner it is not required to actually use the architecturally visible load destination register for forwarding of loaded data to the store chunk instruction), the implementation supporting instruction fusion would still need to make the previously loaded data available as corresponding to the at least one architecturally visible load destination register, because there could be a risk of subsequent instructions assuming that the loaded data is present in that architectural register. This may make fusion more complex to implement and require extra circuitry.

In practice, a common use of load chunk and store chunk instructions may be expected to be in memory copy functions. For such functions, the architectural register designated as the architecturally visible load destination register for the load chunk instruction and as the architecturally visible store source register for the store chunk instruction (which are expected to correspond when these two instructions are used in sequence) may not be expected to be needed for subsequent instructions. To eliminate any risk of subsequent instructions relying on the data still being available in the architecturally visible store source register after processing the store chunk instruction, the data designated as corresponding to the store source register may be cleared to a predetermined value such as zero or some other fixed value. This can simplify support for fused implementations of these instructions.

Other Instructions

As well as the load chunk and store chunk instructions, in some implementations the instruction decoder and the processing circuitry may also support one or more additional instructions which may help to support other functions implemented by high level programming languages which may involve comparisons of multiple regions of memory or scanning regions of memory for particular bit sequences. These additional instructions can be used in combination with the load chunk instruction and/or the store chunk instruction described above.

In one example the instruction decoder and circuitry may support a duplicating store chunk instruction which specifies a duplicate destination address and at least one architecturally visible duplicate source register. In response to decoding the duplicating store chunk instruction, the processing circuitry may store, to a duplicate destination block of memory system locations selected based on the duplicate destination address, two or more repetitions of a bit sequence selected from within the data designated as corresponding to the at least one architecturally visible duplicate source register. The size of the duplicate destination block of memory system locations may be determined by the processing circuitry based on at least one implementation-specific condition. This instruction can be useful for supporting functions such as memset( ) which requires a number of repetitions of a particular bit sequence to be written to memory. Supporting implementations-specific determination of the size of the block of memory to be filled with the repetitions of the bit sequence provides architectural flexibility for different implementations to make different decisions, which can improve performance for similar reasons to the store chunk instruction and load chunk instruction described above.

Another example of an additional instruction may be a duplicate chunk instruction which specifies an architecturally visible duplicate length register, an architecturally visible duplicate source register and an architecturally visible destination register. In some examples the architecturally duplicate source register and the architecturally visible duplicate destination register could both share the same architectural register number so that only one register specifier is needed to be encoded by the instruction. In response to the decoding of the duplicate chunk instruction the processing circuitry may: determine, based on at least one implementation-specific condition, a third number of bytes representing a data size within which to duplicate a target bit sequence selected from data designated as corresponding to the architecturally visible duplicate source register; duplicate the target bit sequence to form duplicated data having a size corresponding to said third number of bytes; designate at least a portion of duplicated data as data corresponding to the architecturally visible duplicate destination register; and designate a duplicate length value as data corresponding to the architecturally visible duplicate length register, the duplicate length value indicative of a number of bytes which is less than or equal to the third number of bytes and which is also less than or equal to a number of bytes corresponding to a total size of the at least one architecturally visible duplicate destination register.

The duplicate chunk instruction may provide another way of implementing memset( ) functions, as an alternative to the duplicating store chunk instruction described earlier. Instead of implementing both the duplication and the store to memory in a single instruction, with the duplicate chunk instruction a separate store may then subsequently be executed to store the duplicated data to memory and this store can be done using a store chunk instruction as described earlier. Similar to the load chunk instruction described above, in some implementations, in response to the duplicate chunk instruction, the pocket storage region may be used as extra hidden storage which can be used to record a greater number of repetitions of the bit sequence than is architecturally visible within the architecturally visible duplicate destination register specified by the duplicate chunk instruction. If the pocket is used, then any bytes of data stored within the pocket may not be indicated within the number of bytes expressed by the duplicate length value. This provides similar advantages to the load chunk instruction regarding use of the pocket as discussed above, but may help support additional library functions such as memset( ).

Another example of an additional instruction that can be useful is a compare chunk instruction which specifies at least one architecturally visible first compare operand register and an architecturally visible compare length register. In response to the instruction decoder decoding the compare chunk instruction, the processing circuitry may: determine, based on at least one implementation-specific condition, a fourth number of bytes indicative of how many bytes of data are to be compared; set comparison status information depending on a comparison between a first compare operand and a second compare operand, the first compare operand and the second compare operand each having a size corresponding to the fourth number of bytes, where at least a portion of the first compare operand comprises data designated as corresponding to the at least one architecturally visible first compare operand register; and designate a compare length value as data corresponding to the architecturally visible compare length register, the load length value indicative of a number of bytes which is less than or equal to the fourth number of bytes. The second compare operand comprises either: (1) data, at least a portion of which is data designated as corresponding to at least one architecturally visible second compare operand register specified by the compare chunk instruction; or (2) data loaded in response to the compare chunk instruction from a compare source block of memory system locations selected based on a compare source address specified by the compare chunk instruction.

Such a compare chunk instruction may be useful for implementing further C library functions such as memcmp( ) which compares data in respective blocks of memory. Similar to the earlier instructions, the compare chunk instruction may use pocket storage region (if available) to compare a greater amount of data than is architecturally visible as corresponding to the first compare operand register. Different variants of the compare chunk instruction may be defined for defining the second compare operand, either loading this operand from memory in response to the compare chunk instruction itself, or reading the second compare operand from a register (to which an earlier instruction has loaded the second compare operand). Although the comparison status information and compare length value are described separately above, in some implementations these pieces of information could be combined, so for example the compare length value could indicate a position of a non-matching byte of data, not merely a number of bytes validly compared. Other implementations could separate the indications of the length of data compared and the comparison status information which indicates an outcome of the comparison (e.g. whether there is a match, and/or the position of any matching byte).

Another example of an additional instruction is a search chunk instruction which specifies at least one architecturally visible search operand register and an architecturally visible search length register. In response to the instruction decoder decoding the search chunk instruction, the processing circuitry may: determine, based on at least one implementation-specific condition, a fifth number of bytes indicative of how many bytes of data within a search operand are to be searched for a target bit pattern, the search operand comprising data including data designated as corresponding to the at least one architecturally visible search operand register; set search result information depending on whether the target bit pattern is found within the search operand; and designate a search length value as data corresponding to the architecturally visible search length register, the search length value indicative of a position of the target bit sequence in a case when the target bit pattern is found, and indicative of a value less than or equal to the fifth number of bytes.

This instruction can be useful for enabling functions such as strlen( ) to be implemented with the number of bytes to be searched for the target bit pattern being selected in an implementation specific manner depending on the specific constraints on a particular implementation. The processing circuitry returns a search length value which can be used to record the position of the target bit sequence in a case when the target bit pattern is found in the searched bytes, as well as search result information depending on whether the target bit pattern was found. In cases when the target bit pattern is not found then the search length value may be used to record how many bytes of data were searched. Similar to the earlier instructions described, again the search chunk instruction may use the pocket storage region (if available) to search additional bytes of data which are not architecturally visible as corresponding to the architecturally visible search operand register, so that some implementations may improve performance compared to other implementations which restrict the search only to the data corresponding to the architecturally visible search operand register.

It will be appreciated that not all of these instructions need to be supported by a given implementation. Different implementations may choose different options of which instructions to support.

Simulation

The techniques discussed above may be implemented within a data processing apparatus which has hardware circuitry provided for implementing the instruction decoder and processing circuitry discussed above. However, the same techniques can also be implemented within a computer program which executes on a host data processing apparatus to provide an instruction execution environment for execution of target code. Such a computer program may control the host data processing apparatus to simulate the architectural environment which would be provided on a hardware apparatus which actually supports a certain instruction set architecture, even if the host data processing apparatus itself does not support that architecture. Hence, the computer program may comprise instruction decoding program logic which decodes program instructions of the target code to control the host data processing apparatus to perform data processing in response to the program instructions of the target code (e.g. mapping each instruction of the target code to a sequence of one or more instructions in the native instruction set of the host which implements equivalent functionality). The instruction decoding program logic may include load chunk instruction decoding program logic and store chunk instruction decoding program logic which responds to load/store chunk instructions in a similar way to discussed above. Also, the instruction decoding program logic may support the other instructions mentioned earlier (e.g. duplicating store chunk, duplicate chunk, etc.). When simulating loading/storing from/to memory, this may be emulated in a simulated fashion, as the address space addressed by the target code may not be the same as the host address space used by the host processor. Also, the simulation may simulate the registers defined by the simulated architecture using accesses to host storage of the host processor (e.g. host registers or host memory).

Such simulation programs are useful, for example, when legacy code written for one instruction set architecture is being executed on a host processor which supports a different instruction set architecture. Also, the simulation can allow software development for a newer version of the instruction set architecture to start before processing hardware supporting that new architecture version is ready, as the execution of the software on the simulated execution environment can enable testing of the software in parallel with ongoing development of the hardware devices supporting the new architecture.

The simulation program may be stored on a storage medium, which may be an non-transitory storage medium.

Specific Examples

FIG. 1 schematically illustrates an example of a data processing apparatus 2. The data processing apparatus has a processing pipeline 4 which includes a number of pipeline stages. In this example, the pipeline stages include a fetch stage 6 for fetching instructions from an instruction cache 8; a decode stage 9 for decoding the fetched program instructions to generate micro-operations (decoded instructions) to be processed by remaining stages of the pipeline; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages. For example in an out-of-order processor a register renaming stage 10 could be included for mapping architectural registers specified by program instructions or micro-operations to physical register specifiers identifying physical registers in the register file 14. In some examples, there may be a one-to-one relationship between program instructions decoded by the decode stage 9 and the corresponding micro-operations processed by the execute stage. It is also possible for there to be a one-to-many or many-to-one relationship between program instructions and micro-operations, so that, for example, a single program instruction may be split into two or more micro-operations, or two or more program instructions may be fused to be processed as a single micro-operation (e.g. supporting fusion of the load/store chunk instructions described below).

The execute stage 16 includes a number of processing units, for executing different classes of processing operation. For example the execution units may include a scalar processing unit 20 (e.g. comprising a scalar arithmetic/logic unit (ALU) 20 for performing arithmetic or logical operations on scalar operands read from the registers 14); a vector processing unit 22 for performing vector operations on vectors comprising multiple data elements; and a load/store unit 28 for performing load/store operations to access data in a memory system 8, 30, 32, 34. Other examples of processing units which could be provided at the execute stage could include a floating-point unit for performing operations involving values represented in floating-point format, or a branch unit for processing branch instructions.

The registers 14 include scalar registers 25 for storing scalar values, vector registers 26 for storing vector values, and control/status registers 27 for storing information used to control processing, such as mode values, conditional status flags, exception handling information, etc.

A memory management unit (MMU) 36 controls address translations between virtual addresses (specified by instruction fetches from the fetch circuitry 6 or load/store requests from the load/store unit 28) and physical addresses identifying locations in the memory system, based on address mappings defined in a page table structure stored in the memory system. The page table structure may also define memory protection attributes which may specify access permissions for accessing the corresponding pages of the address space, e.g. specifying whether regions of the address space are read only or readable/writable, specifying which privilege levels are allowed to access the region, and/or specifying other properties which govern how the corresponding region of the address space can be accessed. Entries from the page table structure may be cached in a translation lookaside buffer (TLB) 38 which is a cache maintained by the MMU 36 for caching page table entries or other information for speeding up access to page table entries from the page table structure shown in memory.

In this example, the memory system includes a level one data cache 30, the level one instruction cache 8, a shared level two cache 32 and main system memory 34. It will be appreciated that this is just one example of a possible memory hierarchy and other arrangements of caches can be provided. The specific types of processing unit 20 to 28 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness.

In this example the processing apparatus 2 also includes a prefetcher 40 for generating prefetch requests to speculatively prefetch data from addresses which have not yet explicitly been requested for access by the load/store unit 28 into the level 1 data cache 30. For example the prefetcher 40 may monitor patterns of memory accesses issued by the load/store unit 28 to learn correlations between trigger events (e.g. processing reaching a certain program counter address or accessing a certain data address in memory) and data addresses accessed some time after the trigger event. The prefetcher 40 could also be trained to learn stride patterns of memory accesses where the addresses of successive accesses are at regular intervals of a constant stride offset. It is also possible to generate prefetch requests in response to other events occurring during processing of instructions which may indicate that there is a likelihood that data from a particular address may be needed in the near future. By prefetching data into the level 1 data cache 30 ahead of the time when it is explicitly requested by a load instruction executed by the pipeline 4, this improves performance as when the data is subsequently actually requested the delay in accessing it may be shorter than if it had to be brought in from the level 2 cache 32 or main memory 34. While the prefetcher 40 as shown in FIG. 1 is being associated with the level 1 data cache 30, in other examples prefetchers could prefetch data into a level 2 cache 32 or further cache.

The apparatus 2 also has debug circuitry 42 for supporting debug functions for diagnosing information about the state of the processing apparatus 2 when executing a particular program. This can be useful for software developers to gain insight into why a particular program being developed is not running correctly or is performing inefficiently. The debug circuitry may include a debug interface 44 which communicates with an external diagnostic device. The debug circuitry may receive debug commands from the external device via the debug interface 44, such as commands to configure the debug circuitry 42 to monitor behaviour of the executing program, or may receive debug instructions to be executed by the processing apparatus 2. One aspect of the debug functionality may be the monitoring of watchpoints. Watchpoint monitoring circuitry 46 is provided to monitor the addresses of data accesses requested by the load/store unit 28 in response to instructions executed in the program being monitored. The external device may use a debug interface 44 to program watchpoint address registers 48 to indicate data addresses which are compared with the data addresses specified by load/store instructions processed by the load/store unit 28. When the watchpoint monitoring circuitry 46 detects that a data address specified by a load/store instruction matches one of the watchpoint addresses defined in the watchpoint address registers 48, the watchpoint monitoring circuitry 46 triggers signaling of an exception to interrupt the processing in the program being monitored, so that the debug circuitry 42 can step in and perform a diagnostic function such as examining the contents of some registers 14 or causing the pipeline to execute one or more debug instructions supplied via the debug interface 44 instead of the instructions of the program whose execution is being monitored for diagnostic purposes.

The apparatus 2 may also comprise pocket storage circuitry 50 which provides an additional storage region for temporarily storing data. The pocket storage circuitry 50 will be described in more detail below, but is shown in dotted lines because some implementations may not provide the pocket storage circuitry 50 at all, and even in implementations which do provide pocket storage circuitry 50, in some cases the pocket storage circuitry 50 may be implemented using one of the other storage structures already shown in FIG. 1, such as reusing some currently unused registers 14 (such as the vector registers 26, or general purpose registers 25 not currently mapped to architectural registers by the rename circuitry) 10). The pocket storage circuitry 50 could also be implemented using a region of memory 34, for example. Other implementations may provide the pocket storage circuitry 50 as a dedicated storage structure separate from the other structures provided for the registers 14, caches 30, 32, 8 and memory 34.

Instructions to Load and Store Arbitrary Amounts of Data

Memory copies, and specifically the C library functions memcpy, memset, memcmp, strcmp, strcpy are frequently used, up to 20% of the time of some applications. Even if the size and alignment is known (as for e.g. structure assignment), inline implementation can be difficult to get performance-portable because of the different characteristics of different implementations. The C library functions are in a much worse position as they may be called with arbitrary size and alignment. A library implementation might do an initial check on its inputs and dispatch to optimized versions for aligned copies, but this initial dispatch itself has overhead and may be a hard-to-predict branch.

There are a number of problems with current approaches to handling such functions:

Efficient support for unaligned access might be implementation-specific. For skewed copies (where the source and destination alignment are different) some applications favour unaligned loads, some favour unaligned stores, some might even implement either or both so inefficiently (e.g. when alignment trapping is enabled) that it's faster to do aligned load and stores and shuffle the bytes in software.

Cores on asymmetric multi-processor systems (systems with cores of different designs with varying levels of performance/energy-efficiency) may have different preferred implementations of these functions. If the preferred implementation is selected at process startup (ifunc, tuned libraries etc.) based on the characteristics of the current core, it may be out of date as soon as the process is migrated.

using lots of architectural work registers for a copy adds to register pressure (e.g. as in sequences of load/store multiple instructions where each instruction loads to or stores from multiple architectural registers).

although vector registers 26 may be available, techniques like lazy context switching, or power-gating in the SIMD unit (vector unit 22), or SIMD units shared between processing elements (none of which are easily discovered from userspace), significantly change the break-even point for using them;

string searches and comparisons should not cause page faults in data that the language specification says is not accessed, which complicates efforts to process data in chunks larger than a byte.

It can be desirable to provide instructions which:
are very efficient for small copies (under 128 bytes);
are reasonably efficient for large copies;
are suitable for copies where size and alignment is unknown;
are suitable for copies where size and alignment is known, e.g. for compiler-generated structure copies;
are suitable for all microarchitectures, other than perhaps for small fixed-length copies (e.g. 4 or 8 aligned bytes) that can be implemented via general-purpose registers;
work correctly and efficiently on asymmetric multi-processor systems and other heterogeneous systems where a process may be migrated at any point;
are interruptible—should not tie up the core for hundreds of cycles;
correctly handle page faults and data watchpoints;
do not introduce new architectural state that needs to be context-switched;
make forward progress when single-stepped;
do not combine load and store in one architectural instruction, because it is less RISC-like and complicates exception handling;
support non-temporal (streaming, uncached) copying;
are debuggable;
are possible to implement in a software emulator, dynamic instrumentation tool etc.

It will be appreciated that not all of these properties may be satisfied for all implementations of the instructions, but it is useful if many of these conditions can be satisfied.

Figure 2:
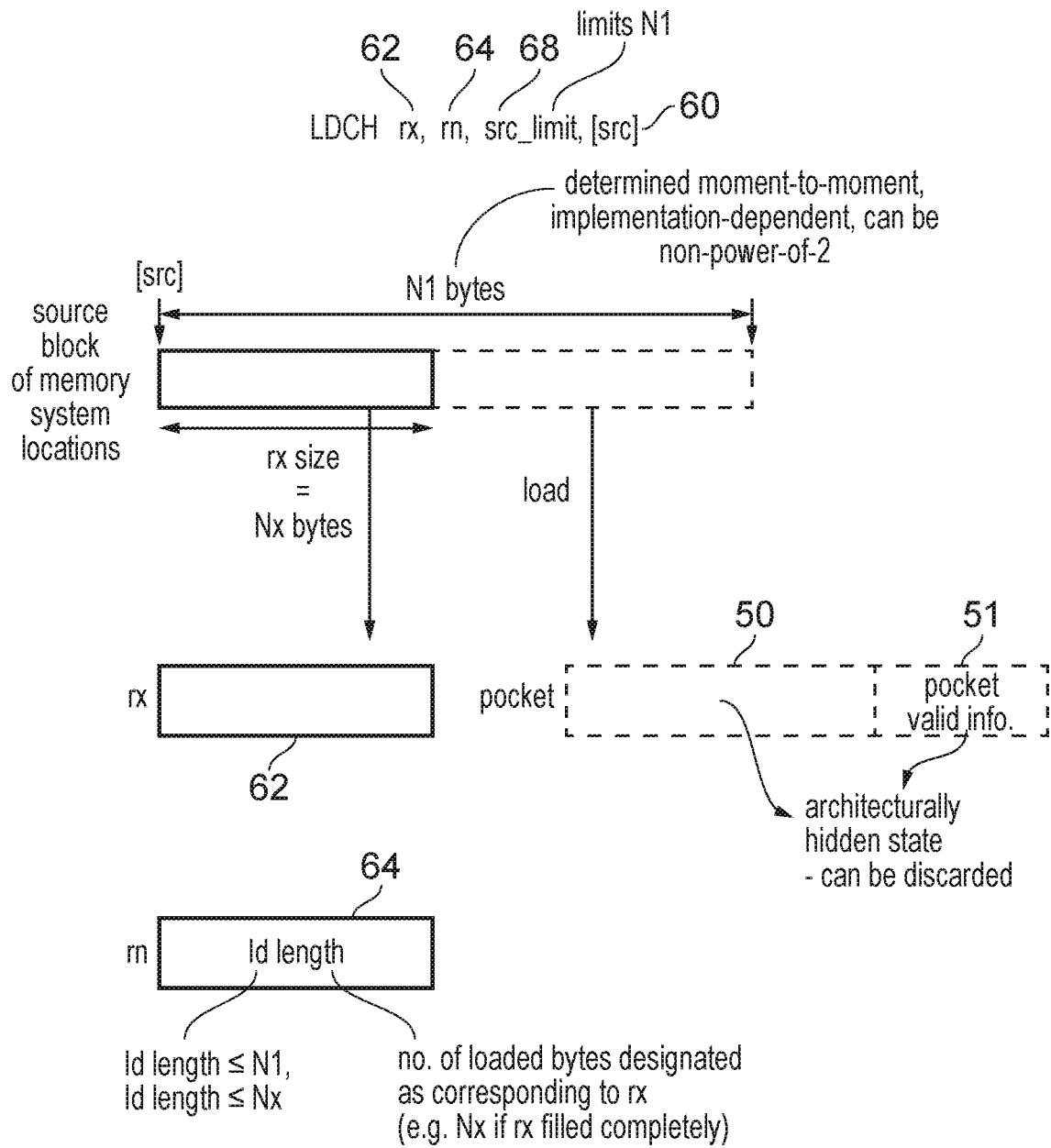
FIG. 2 illustrates a load chunk instruction.
Figure 3:
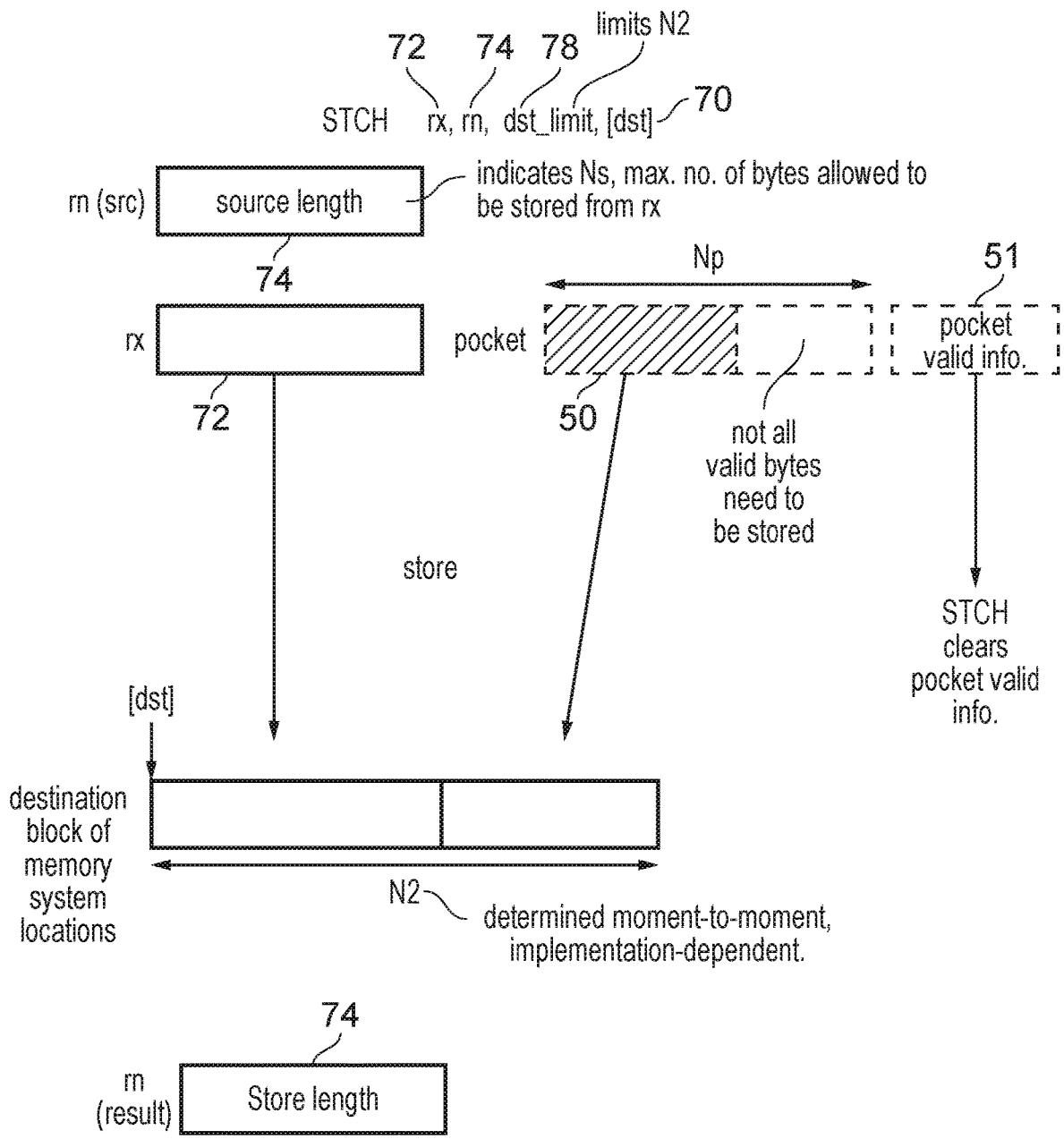
FIG. 3 illustrates a store chunk instruction.

FIGS. 2 and 3 illustrate load chunk instruction and a store chunk instruction respectively. These can be used for implementing memcpy( ) functions as a loop of Load Chunk (LDCH) and Store Chunk (STCH) instructions. A problem here (which is discussed further below) is finding a place to put the chunk, which is big enough to transfer enough bytes at a time to rapid progress, but puts minimum demands on architectural state.

```
loop:
    ldch rx, rn, src_limit, [src]
    stch rx, rn, dst_limit, [dst]!
    add src, src, rn
    blt loop
```

As shown in FIG. 2, LDCH specifies a source address 60 (e.g. using a source base register), a source limit register 68, a source destination (work) register 62 (or set of registers) rx, and a load length register 64 rn. If the base address is equal to the limit address defined by the source limit register, the instruction behaves as a no-operation instruction (NOP). Architecturally, in terms of observed state, after LDCH (e.g. an interrupt occurs or the base register is read), the value in rn 64 will at that point be defined to be a load length value indicating a number of bytes between 1 and Nx (the size of the one or more source destination registers rx), with rx containing between 1 and N bytes of data (the rest can be zeroes). If a page fault would occur at the start of the buffer, the implementation takes the page fault. Otherwise it loads up to (at most) the end of the page, from a source block of memory system locations selected based on the source address 60. LDCH is required to load at least one byte if it completes. If an interrupt or page fault occurs before any bytes are loaded, the instruction is considered not to have executed and will be restarted with its original base address. The instruction only completes with result rn zero if the source buffer is already at its limit. Because LDCH has the limit register 68 as input, the processor knows the overall buffer size and on higher-end implementations the prefetcher 40 can cause one or more prefetches to bring additional lines of the buffer into cache, without needlessly prefetching past the end of the buffer.

As shown in FIG. 3, STCH specifies a destination address (e.g. using a destination base register) 70, a destination limit register 78, a store source (work) register rx 72, and a store length register rn 74 (which in this example also specifies as a source length register). In response to STCH, the processing circuitry 4 stores, to a destination block of memory system locations identified by the destination address, data from the store source register rx, up to N bytes. Store Chunk may store fewer bytes than were originally loaded, e.g. because a page fault or data address watchpoint occurs during the transfer, or for alignment reasons. It returns the number of bytes successfully stored, in the store length register rn 74, and updates its base register 70 by incrementing the previous base address by the number of bytes stored. If a page fault occurs in the middle of the destination buffer, it is equally valid for STCH to store the initial fragment up to the page boundary or to store no bytes at all. For convenience, STCH has an implicit "cmp dst,dst_limit" following the update of the base register (comparing the incremented destination base address 70 against the limit and setting status flags in control registers 27 to indicate a result of the comparison), so that BLT (a conditional branch for which the branch is taken if the status flags in control registers 27 indicate that the previous comparison outcome was a less than comparison) can be used for controlling the branch back to the start of the loop (avoiding a need for an additional comparison instruction separate from STCH).

These two instructions are sufficient for copies on various alignments, but we propose a refinement that allows more bytes to be copied in one chunk, if the implementation supports it. As shown in FIG. 2, in addition to loading into rx, LDCH may load a longer sequence of bytes, starting at the base address, into a non-architectural scratch space (which we call the "pocket" 50). Pocket validity information 51 is set to indicate that there is valid data stored in the pocket 50 and to indicate the number of bytes loaded. We expect the pocket not to be extremely large, so that the time to fill it is well below the normal time between interrupts, and LDCH will often completely fill it. This should ensure a reasonable rate of progress.

If the pocket validity information indicates that the pocket state is valid, STCH stores from the pocket (rather than rx), up to whatever number of bytes was loaded into the pocket. The pocket state is then completely invalidated. As before, the store length value 74 in rn is set to the number of bytes stored.

The architecturally visible work register rx guarantees that if we take an exception between the load and store for any persistent reason (e.g. single-stepping, or data address watchpoint on the destination), we do at least have one byte in architectural state, that can be stored, guaranteeing forward progress. However, in the case when bytes are loaded to and stored from the pocket, and no exception or read to the load destination register occurs between the LDCH and the STCH, it is not essential to actually load any bytes to a location corresponding to the architecturally visible load destination register—in some implementations the N1 bytes loaded in response to LDCH could be loaded entirely to the pocket 50 and the N2 bytes stored in response to STCH could be stored entirely from the pocket 50. In other implementations, in cases when the pocket is used, LDCH could load Nx bytes to the architectural register rx and load N1-Nx bytes to the pocket, and similarly STCH could store Nx bytes from architectural register rx and store N2-Nx bytes from the pocket. We could think of the core speculatively executing along two paths—both have an architecturally visible outcome, in one path the intermediate state is architecturally visible and well-defined, in the other path the intermediate state is non-architectural and the path disappears if interrupted.

The pocket could be anything—a dedicated buffer, one or more physical hardware registers, a line fill buffer, something out in the memory fabric. It may be discarded for any reason. Physical SIMD (vector) registers 26 can be used even if SIMD is architecturally disabled, e.g. when using lazy context switching, the architectural state of the SIMD registers may belong to a previous process but the current process can still use physical registers as buffers. Implementations can use different-sized pockets. A large implementation would likely have several physical pockets, allowing multiple iterations to be in flight. A small implementation might not use a pocket at all. Because of the way the pocket "evaporates" on an interrupt, migrating between big and little implementations is possible at any point.

If the work register X is observed between LDCH and STCH, it has a defined value. There are various options for what it could contain after the STCH—we could define it to always have the initial fragment loaded by LDCH, or zeroes, or an undefined value. Defining it as having zeroes (or another default predetermined value unrelated to the actual value of the loaded bytes) would avoid having to write loaded data to it if the pocket path was taken.

In some examples, rather than defining the work (load destination or store source) register rx 62, 72 as a single (architectural) register, we could define it as a set of registers, say two or four registers. A single register specifier could identify the set of registers if it is assumed that the set of registers have consecutive architectural register numbers. On implementations where a non-architectural pocket is also provided, having larger architectural space doesn't buy us much (the pocket can be assumed to be bigger) but it helps if for whatever reason we're restricted to architectural state.

The fact that the pocket state may be discarded, and that STCH may only store part of the data, means that data may be re-read, which may be observable for Device memory. The C functions make no guarantees about re-reading (or re-writing) data and the current optimized implementations do both. If special handling for Device memory is wanted, the proposed instructions mean that it could be offered automatically with no software changes. For example, the instructions could fall back to using architectural state only when used on Device memory.

Aligned copies may encounter a destination page fault. Suppose we are copying between aligned addresses, e.g. from 0x1000 to 0x2000, and have a 256-byte pocket. The first LDCH loads 256 bytes from 0x1000. But suppose STCH takes a page fault data abort on 0x2000 (e.g. first touch of a copy-on-write page). The pocket data is discarded, the page fault handler returns, and retries the STCH, now with only the architected state—the 8 bytes in rx. So STCH stores 8 bytes, and the base addresses update to 0x1008 and 0x2008. If we transfer a full pocket on every iteration, all subsequent iterations will be 8 bytes into a line. This is undesirable, as we have gone from an aligned copy to an unaligned copy. A sophisticated page fault handler could spot that it was a STCH that faulted, and adjust the saved rn 64/74 to zero so that the next iteration would reload the original data. However, it may be preferable for the micro-architectural implementation to deal with this issue. For example, a given implementation could allow the 8-byte STCH proceed, and the microarchitecture could arrange for the next LDCH to load slightly less than a pocket's worth of data. The point is that the architectural specification gives the microarchitecture freedom to do the loads and stores in whatever way best fits the microarchitecture.

In most cases with non-aliasing source/destination blocks of memory, the use of the pocket is invisible to the programmer. However, if implemented as above, its effect can be seen if the destination overlaps the source:
uint64_t a[ ]={1, 2, 3, 4, 5};
memcpy(&a [1], &a [0], 32);

Suppose this is implemented as an ascending LDCH/STCH loop with a 64-bit work register rx. Without a pocket, each iteration loads and stores 64 bits and we end up with 1,1,1,1,1. With a 128-bit pocket, we end up with 1,1,2,2,4. With a 256-bit pocket we end up with 1,1,2,3,4. C memcpy( ) is undefined in this situation, and we would already see variation between compilers, libraries etc. depending on how they unrolled their memcpy( ) loops. With the pocket, we might see variation between implementations, or even transiently in the same implementation, e.g. if one time the loop had been interrupted and the pocket was discarded. We might see variation between normal runs, and debugging runs that disabled or discarded the pocket, e.g. when single-stepping or emulating—i.e. it may be hard to debug issues related to the pocket. In many cases, this may not necessarily be a problem. However, if this is thought to be undesirable, one solution would be for LDCH to record the virtual source address 68 in the pocket (e.g. as part of the pocket validity information 51), and then STCH could check for aliasing, and fall back to storing the architectural register in that case. Potentially STCH could resolve the aliasing itself, and act in a way compatible with the discarded-pocket case.

Figure 4:
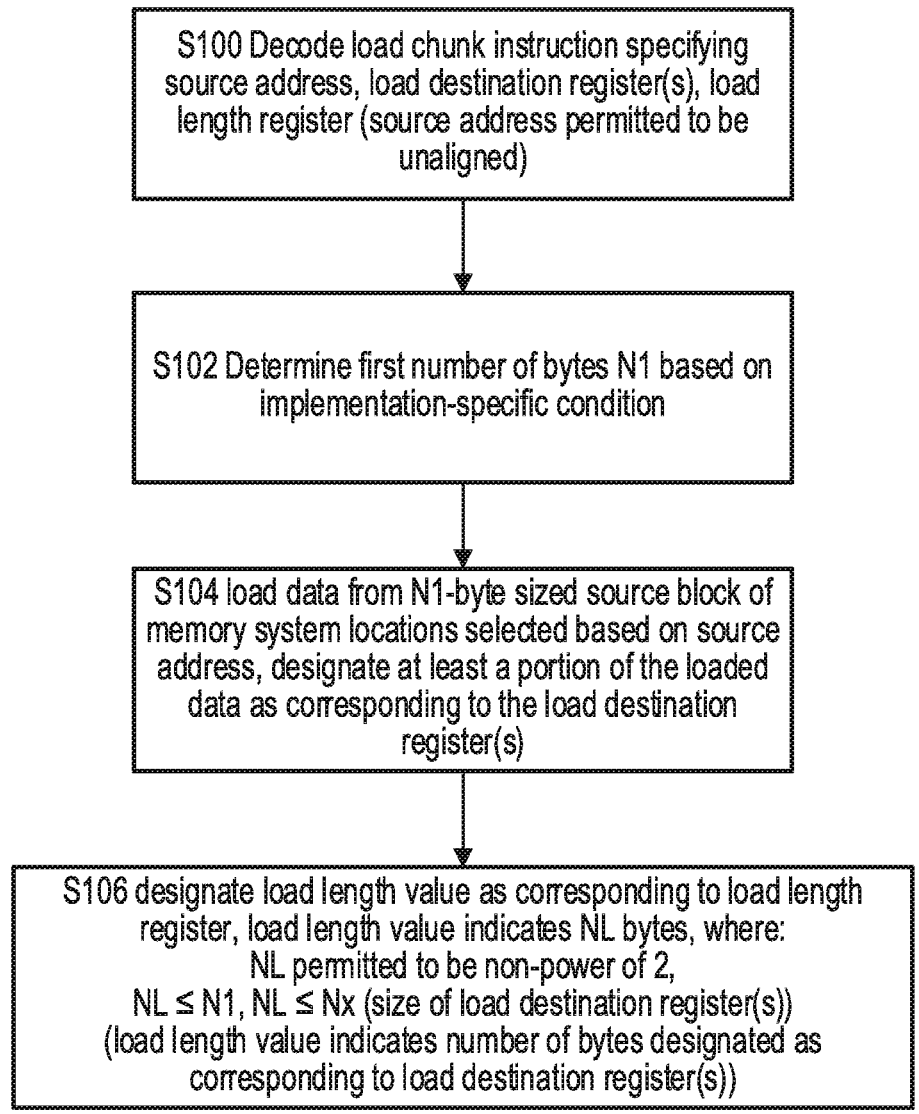
FIG. 4 is a flow diagram illustrating processing of a load chunk instruction.

FIG. 4 illustrates a flow diagram showing processing of a load chunk instruction. At step S100 the instruction decoder 9 decodes a load chunk instruction which specifies a source address 60, one or more load destination registers (rx) 62 and a load length register (rn) 64. The source address 60 is permitted to be an unaligned address which is not aligned to an address alignment boundary corresponding to a multiple of a power of 2 data block size. The load/chunk instruction could specify some additional information such as the source limit value 68 which may encode an upper limit on the number of bytes that are allowed to be loaded in response to the load chunk instruction.

In response to the instruction decoder 9 decoding the load chunk instruction, at step S102 the instruction decoder 9 controls the processing circuitry 16 to determine a first number of byes N1 to be loaded from memory in response to the load chunk instruction. The first number of bytes N1 is determined based on an implementation-specific condition. Also, some architecturally-defined constraints may be imposed on the determination of the first number of byes N1. Step S102 is described in more detail below with respect to FIG. 6.

At step S104 the load/store unit 28 of the processing circuitry 16 loads data from a source block of memory system locations selected based on the source address specified by the load chunk instruction. The size of the source block of memory system locations is N1 bytes as determined at step S102. At least a portion of the loaded data is designated as corresponding to the one or more load destination registers specified by the load chunk instruction. Designation of the data as corresponding to the load destination register may be done either by actually writing it to a physical register in the register bank 14 or by forwarding the loaded data on an operand forwarding path for use as an input operand by a subsequent instruction which references the load destination as a source register. It will be appreciated that there are a variety of ways in which a particular implementation of the processing pipeline 4 may ensure that the data loaded to be designated as corresponding to the load destination register is made available to subsequent instructions which reference that register, so the claimed subject matter is not limited to any one particular technique for achieving this. In some cases, an implementation providing the pocket 50 may choose to load all N1 bytes to the pocket (even if some of those bytes would also be designated as corresponding to the load destination register(s) rx), to avoid a subsequent STCH instruction needing to read bytes from multiple locations.

At step S106 a load length value is designated as corresponding to the load linked register 64. The load length value indicates that a certain number of bytes, NL, have been loaded from memory and designated as corresponding to the load destination register(s). In other words the load length value indicates the total number of bytes designated as corresponding to the one or more load destination registers specified by the instruction. Hence, NL should be less than or equal to Nx representing the combined size of the one or more load destination registers. NL may be less than or equal to N1, as some data may have been loaded to the pocket storage circuitry 50, but any bytes that are loaded to the pocket 50 are not accounted for in the number of bytes NL indicated by the load length value. NL can be a number other than a power of 2.

Figure 5:
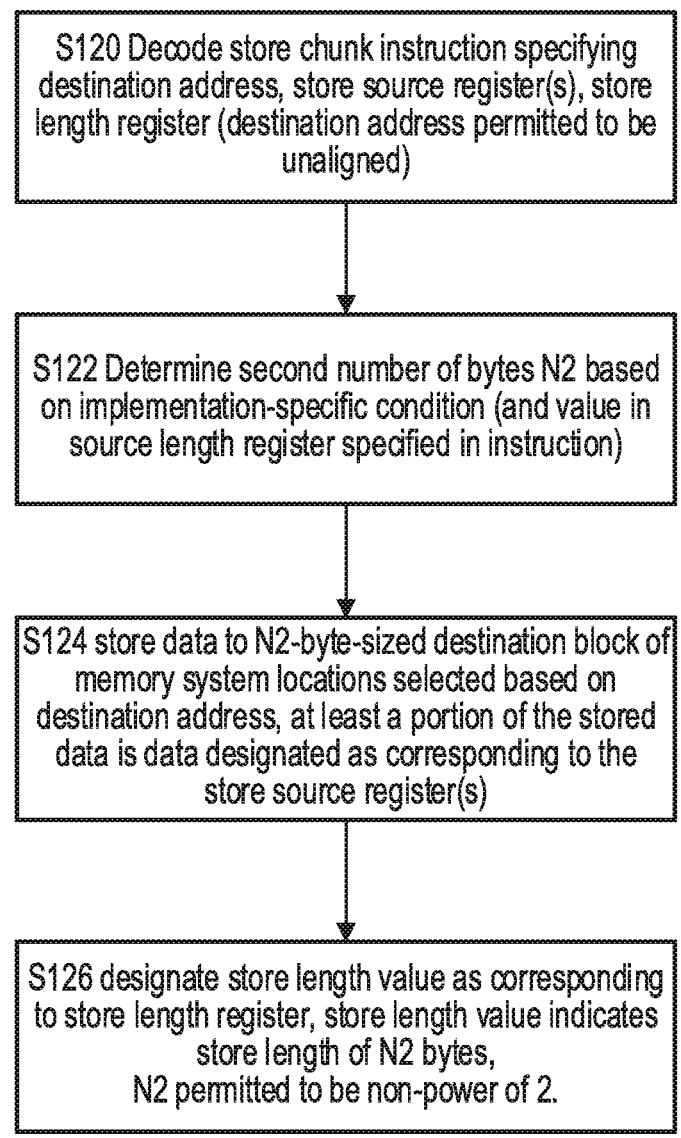
FIG. 5 is a flow diagram showing processing of a store chunk instruction.

FIG. 5 is a flow diagram illustrating processing of a store chunk instruction. At step S120 the instruction decoder 9 decodes a store chunk instruction which specifies a destination address 70, one or more store source registers rx 72, and a store length register rn 74. The destination address is permitted to be an unaligned address which is unaligned with respect to an address alignment boundary. The store chunk instruction also specifies a destination limit value 78 which limits the maximum number of bytes to be stored in response to the store chunk instruction. The store length register rn 74 may also serve as a source length register which provides a further limit on the maximum number of bytes that can be stored in response to the store chunk instruction. In a sequence of instructions for memory copy functions as shown above, the registers rx, rn of the store chunk instruction may be specified using the same architectural register number as the corresponding registers rx, rn of the preceding load chunk instruction.

In response to the store chunk instruction being decoded by the instruction decoder 9, the processing circuitry 16 determines a second number of bytes N2 based on an implementation-specific condition. The determination then too may also be constrained by a value specified in the source length register 74 specified by the store chunk instruction. The source length value in the source length register 74 may indicate an upper limit on the number of bytes allowed to be stored to memory from among the data designated as corresponding to the store source register(s) 72. Also, the destination limit value 78 indicates a limit to the block of memory system locations to which the store chunk should store data, and this also constrains the number of bytes determined as N2. In addition to considering a store length register value and the implementation-specific condition, certain architecturally defined state (e.g. protection table entries, watchpoint addresses) may also limit the number of bytes determined as the second number N2 of bytes to be stored to memory in response to the store chunk instruction.

At Step S124 the load/store unit 28 of the processing circuitry 16 stores data to a destination block of memory system location selected based on the destination address 70. The size of the destination block of memory system locations is N2 bytes. At least a portion of the stored data stored to memory is the data designated as corresponding to the store source register(s) rx. In implementations which support the pocket storage circuitry 50 is also possible that some (or all) of the N2 bytes of data may be stored from the pocket 50 to memory.

At step S126 the processing circuitry 16 designates a store length value as corresponding to the store length register 74. The store length value indicates the second number of bytes N2 which were stored to memory, which includes both bytes of data stored form the data designated as corresponding to the store source registers and also includes any valid bytes stored to memory from the pocket 50. The second number of bytes N2 is permitted to be a non-power of 2 value.

Figure 6:
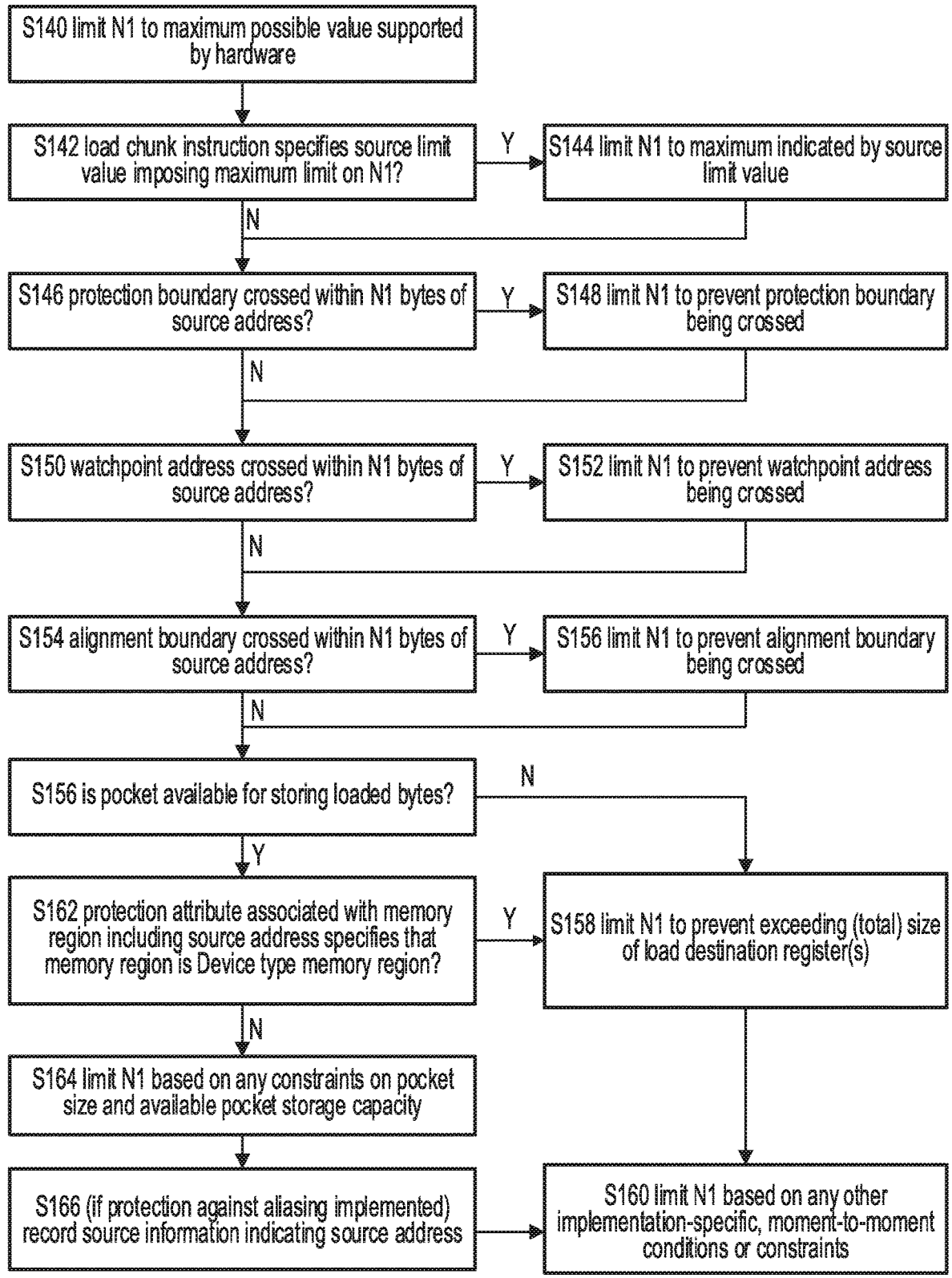
FIG. 6 is a flow diagram illustrating determining a number of bytes to load in response to the load chunk instruction.

FIG. 6 is a flow diagram showing in more detail determination of the first number of bytes N1 to load from memory in response to the load chunk instruction at step S102 of FIG. 4. At step S140 the first number of bytes N1 is initially limited to the maximum possible value that is supported by the hardware of the data processing apparatus 2. For example, N1 could be limited by the maximum capacity of the one or more load destination registers 62 and/or pocket storage circuitry 50, or by limitations in memory system capacity for handling load requests in response to the load chunk instruction.

At step S142 the processing circuitry 16 determines whether the load chunk instruction specifies the source limit value 68 imposing a maximum limit on the first number of bytes N1. It is possible to define the source limit value 68 using a predetermined value (e.g. 0) which may indicate there is no end limit to the region of memory from which data can be loaded by the load chunk instruction, so the source limit value 68 need not always encode a specific maximum limit. However if a maximum limit is defined in the source limit value 68 then at step S144 the first number of bytes N1 is limited to the maximum indicated by the source limit value. The source limit value could be represented in different ways. For example the source limit value could define the maximum as a maximum number of bytes or as a defined address indicating the limit to the block of memory system locations which can be used as the load destination block of memory system locations in response to the chunk instruction. In either case the source limit value 68 could effectively be seen as a maximum offset relative to the source address 60 beyond which data should not be loaded in response to the load chunk instruction. In some implementations the previous value of data designated as corresponding to the load length register rn (64) could also impose a limit on the maximum number of bytes which are allowed to be loaded, at least to the load destination registers 62 (in some cases loading to the pocket may still surpass the number of bytes indicated in the previous value associated with the register rn). However, this is optional and other architectures may define load chunk as determining the number of bytes to load independent of the previous value in register rn.

At step S146, regardless of whether any limit to N1 was imposed based on the source limit value 68, the processing circuitry 16 determines whether a memory protection boundary is crossed within N1 bytes of the source address 60. A protection boundary is a boundary between memory regions which are associated with different protection entries in a protection table which defines protection attributes for determining whether access to the memory regions is allowed and/or controlling address translation for those regions. For example, the protection entries can be page table entries used by the MMU 36 to control address translation. In another example, the protection entries could be entries of a table structure which indicates which security domain is associated with a particular region of the memory address space, where for example a region associated as a more secure domain may not be accessible by program code executing in a less secure domain. Hence, there are a range of ways of implementing protection tables which define protection attributes for controlling access to memory on a per-region basis. If the load source block of memory system locations spans regions associated with different protection entries then there is a risk of a fault being triggered partway through the accesses to the source block of memory system locations, if the protection entry for the subsequent region has not yet been defined or the protection entry for that region specifies attributes prohibiting the access. Exception handling on memory protection faults may be simpler if an instruction faults in its entirety rather than partway through its accesses, as this avoids the need to record information regarding how many bytes were successfully loaded by the partially faulting instruction. Therefore, if it is determined that a protection boundary is crossed within N1 bytes of the source address, then at step S148 the first number of bytes N1 is limited to prevent the protection boundary being crossed. For example, N1 may be limited to be no greater than the offset between the source address 60 and the address at the next protection boundary after the source address.

At step S150 the processing circuitry 4 determines whether a watchpoint address defined in the watchpoint address registers 48 would be crossed within N1 bytes of the source address and if so then at step 152 the first number of bytes N1 is limited to prevent the watchpoint address being crossed, for example limiting the first number of bytes N1 to be no greater than the offset between the source address 60 and the address of the next watchpoint address after the source address. Similar to the protection faults, for diagnostic purposes it may be simpler if the load chunk instruction faults due to the source address matching a watchpoint address rather than an address of a subsequent access within the source block of memory system locations matching the watchpoint address.

At step S154 the processing circuitry determines whether an alignment boundary would be crossed within N1 bytes of the source address. The alignment boundary is a boundary between adjacent blocks having a size corresponding to a power of 2 number of bytes. The alignment block size and boundary positions may depend on the way in which the memory system 34 handles memory accesses, which may vary from implementation to implementation. Memory systems may typically be defined to handle memory transactions in aligned blocks of a power of 2 size which start at an aligned address aligned to the power of 2 block boundary. Hence, unaligned accesses to a group of memory system locations which start at an unaligned address (which is not a multiple of the power of 2 block size) are less efficient since they may need to be split into separate aligned accesses each accessing data from one aligned block. In a memory copy loop if each iteration of the loop access is an unaligned address then performance will be greatly reduced since each iteration would require a greater number of memory transactions to be handled by the memory system 34. Hence, if it is determined that an alignment boundary would be crossed within N1 bytes of the source address then at step S156 the processing circuitry limits N1 to prevent the alignment boundary being crossed, for example, capping N1 to ensure that it is no greater than the offset between source address and the address marking the next alignment boundary. This would mean that it is more likely that the source address for a subsequent iteration can be an aligned address so as to make subsequent iterations of a memory copy loop more efficient.

At step S156 the processing circuitry 16 determines whether the pocket storage circuitry 50 is available for storing loaded bytes. The pocket may not be available at all for some processor implementations, and in this case the step S156 may be skipped and the answer may permanently be "no" leading to step S158 being performed. However in implementations which do support the pocket storage circuitry 50, the pocket 50 may nevertheless not always be available, depending on the implementation of the pocket. For example if the pocket storage circuitry 50 reuses space in currently unused registers (e.g. unmapped general purpose registers 25, not currently mapped to an architectural register by the rename circuitry 10, or vector registers 26 which may not currently be used if the program being executed does not include any vector processing instructions), it may be determined whether the pocket is available. Also, even if the pocket storage circuitry 50 is a dedicated structure which is permanently available, the capacity in the pocket storage circuitry 50 may nevertheless already have been used for other instructions.

If the pocket is unavailable then at step S158 the first number of bytes is limited to prevent it exceeding the size of the load destination register rx (or the total size of two or more load destination registers if the load chunk instruction specifies two or more load destination registers). At step S160 the first number of bytes is also limited based on any other implementation-specific or moment-to-moment conditions or constraints that are applied for the particular processor implementation. For example the number of bytes to load may be constrained based on instantaneous conditions of the system such as current memory system bandwidth utilization, spare resources, load buffers associated with a load/store unit 28 or based on a current operating mode of the system.

If at step 156 it was determined that the pocket is available for storing loaded bytes then at step S162 the processing circuitry 16 determines whether a protection attribute, (defined in a protection table in an entry associated with the memory region that includes the source address 60) specifies that the memory region is a device type memory region. A device type memory region is a type of memory region for which there is a risk that performing the same memory access multiple times could cause a side effect which would not be caused if the memory access was only performed once. For example device type memory regions could be defined for regions of memory used for controlling a peripheral device to carry out a particular action which if done twice may be perceived by users as different compared to if the action was only done once. If a source address is determined to be within a memory region indicated as the device type memory region, then at step S158 the first number of bytes N1 may be limited to prevent it exceeding the (total) size of the one or more load destination registers, so that the pocket would not be used for loading data. If the pocket is used for loading data there is a greater risk that a subsequent store chunk instruction may choose not to consume some of the bytes loaded to the pocket because of different implementation-specific constraints evaluated at the time of the store chunk instruction (e.g. different alignment of the store destination address with respect to an alignment boundary compared to the source address), and so a load/store loop implemented to define a memory copy operation may then re-load some of the bytes previously loaded to the pocket on a subsequent iteration which can result in the same memory system location being loaded twice which may be undesirable for device type memory regions. Hence, it can be simpler to prevent the pocket being used when the source address is in device type memory region.

If the source address is not in a device type memory region then at step 164 it is determined that the pocket can be used for loading additional bytes of data from the source block of memory system locations, and the processing circuitry may determine the first number of bytes N1 based on any constraints on the pocket size implemented and/or on available pocket storage capacity.

If protection against aliasing is implemented as discussed above, then at step S166 the processing circuitry 16 also records source information indicating the source address, which can later be used by a subsequent store chunk instruction to evaluate whether an aliasing condition has arisen. The source information may be architecturally hidden state which is not designated as corresponding to an architecturally visible register. For example the source information could be recorded as part of the pocket validity information 51, or in any other way. Following step 166 the method proceeds to step S160 to consider any other implementation-specific or moment-to-moment conditions or constraints the same as described earlier.

Hence, FIG. 6 shows a number of independent constraints that may limit the total number of bytes N1 that are loaded in response to the load chunk instruction. When multiple constraints are applied, each of those constraints may define a particular maximum value for N1 and the eventual value determined for N1 may correspond to the minimum of any of those maximum values determined for different types of constraint. It will be appreciated that not all of the constraints shown in FIG. 6 need to be used in a particular implementation, and so some of these checks could be omitted. Also, while FIG. 6 shows checking the constraints in a particular order as a sequential flow of method steps, it will be appreciated that some of these checks could be reordered and performed in a different order to the order shown in FIG. 6. Also, it is possible to check multiple constraints in parallel.

The various constraints shown in FIG. 6 include some constraints (e.g. steps S142, S146, S150, S162) which are based on architecturally-defined information. FIG. 6 also includes some constraints (e.g. steps S140, S156, S160, S164 and S166) which are based on implementation-specific conditions which may vary from one processor implementation to another or from moment-to-moment, and so the exact number determined as N1 may be different for different instances of executing exactly the same instruction with the same operands on different processor cores (either within entirely different apparatuses or, in a system which includes a number of processor cores of different capabilities, different outcomes may occur depending on which processor core of the multi-core system executes the instruction).

While FIG. 6 shows determining a specific number of bytes N1 which represents the total number of bytes which will be loaded from the source block of memory system locations in response to the load chunk instruction, in some implementations it is not essential for an explicit indication of the value of N1 to be provided. In some cases the processing circuitry 60 may perform functions which are equivalent to determining N1. For example, in cases where some bytes are loaded to the pocket 50 and other bytes are loaded to be designated as corresponding to a load destination register 62, two separate indications may be generated, with the load length value recorded in the load length register 64 indicating the number of loaded bytes designated as corresponding to the load destination register RX and a separate indication of the number of bytes loaded to the pocket 50 being indicated in the pocket validity information 51. In this case N1 could effectively correspond to the total of numbers of bytes indicated in the length value and the pocket validity information 51. Also, in some cases the pocket validity information 51 need not specify a specific number of bytes explicitly, but could be represented as a number of valid bits which each indicate whether a corresponding byte of the pocket 50 is valid, so that the value of N1 could implicitly be indicated as the total of the number of bytes indicated by the load link value and the number of valid bits which are set to indicate the valid bytes in the pocket 50.

Figure 7:
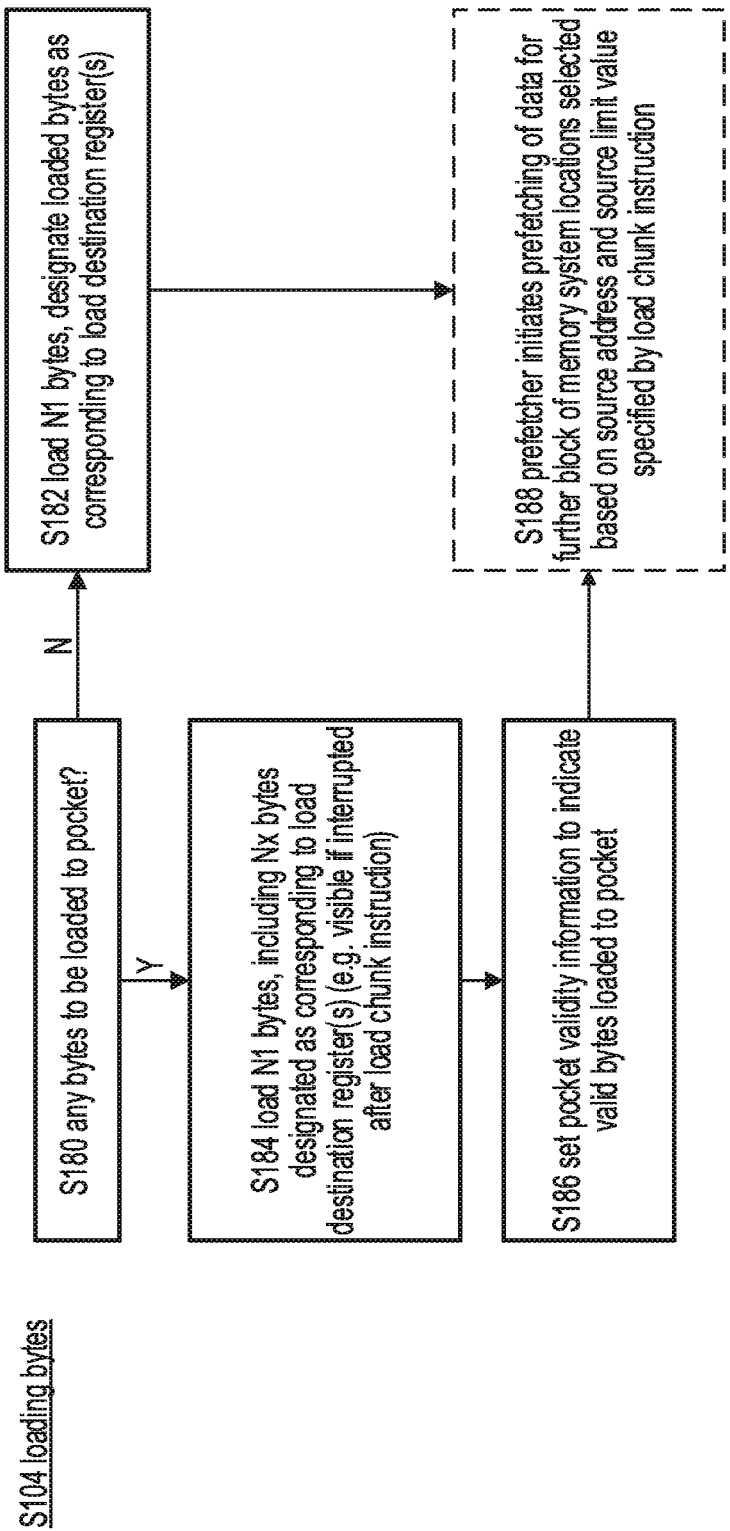
FIG. 7 is a flow diagram showing loading of bytes of data in response to the load chunk instruction.

FIG. 7 is a flow diagram showing in more detail the step of loading bytes at step S104 of FIG. 4. At step S180 it is determined whether any bytes are to be loaded to the pocket 50. If not, then at step S182 the load/store unit 28 loads N1 bytes of data from memory and designates the loaded bytes as corresponding to the one or more load destination registers specified by the load chunk instruction. If any bytes are to be loaded to the pocket then at step S184 the load/store unit 28 similarly loads N1 bytes of data from the source block of memory system locations in the memory system. Nx bytes of that data may be designated as corresponding to the one or more load destination registers. The data designated as corresponding to the load destination registers need not necessarily be actually written to a physical register 14 or made visible architecturally, as it may be assumed that the data designated as corresponding to a load destination register may subsequently be consumed by a store chunk instruction and so in some cases the designation may simply comprise forwarding the loaded Nx of data direct to a subsequent store chunk instruction which references the same architectural register as the load destination register. Hence, in some cases the Nx bytes loaded at step 184 may only become visible as the data corresponding to the load destination register if an interrupt or exception occurs after the load chunk instruction but before a subsequent store chunk instruction or other instruction which reads the load destination register. This also applies to step S182 where any bytes designated as corresponding to the load designation register may not necessarily be visible unless there is an exception occurring after the load destination register but before a subsequent consuming instruction.

At step S184 up to N1 bytes are loaded to the pocket 50. In some implementations, the pocket may store N1-Nx bytes (excluding those loaded to register rx), while other examples could load all N1 bytes to the pocket even if some bytes are to be designated as corresponding to register rx. At step S186 the pocket validity information 51 is set to indicate that there were some valid bytes loaded to the pocket and provide an indication of how many bytes are valid. The pocket validity information 51 could specify a set of valid indicators each indicating a corresponding byte as valid, or a number specifying the total number of valid bytes with the position of the valid bytes in the pocket storage 50 possibly being implicit (e.g. the valid bytes could start at a predetermined location of the pocket and follow on in consecutive locations). At step S188, if a prefetcher 40 is provided, then the prefetcher 40 may initiate prefetching of data into the cache 30 from a further block of memory system locations other than the source block whose data was loaded among the N1 bytes. The further block of memory system locations may be selected based on the source address and the source limit value 68 specified by the load chunk instruction. Hence, the prefetcher 40 may use the source limit value as a hint that it is likely that there will be subsequent load instructions which may load data from addresses up to the source limit 68 and so it can be beneficial to prefetch this data so as to warm up the cache 30 and reduce subsequent delays in processing later instructions which load to that prefetch data.

Figure 8:
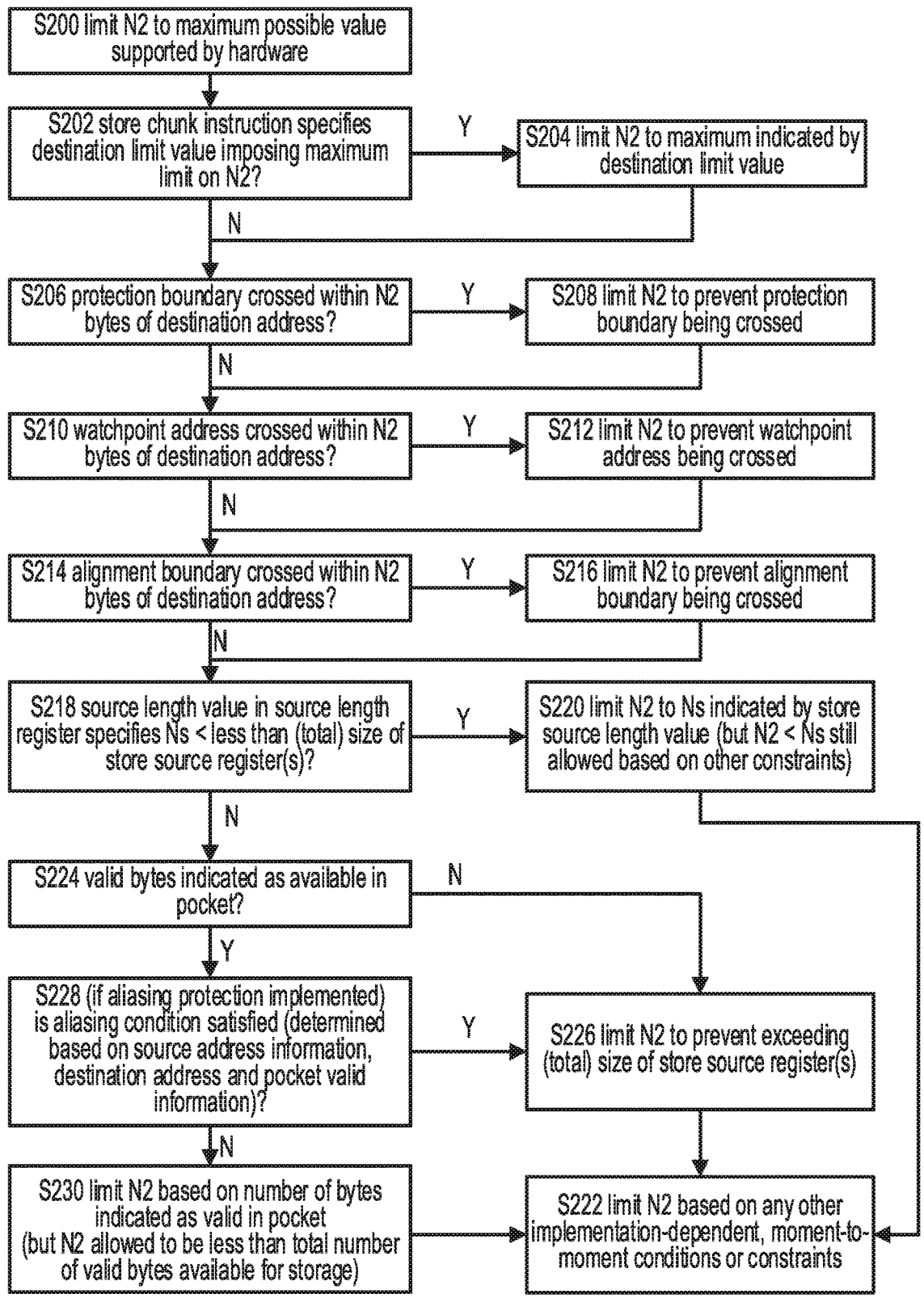
FIG. 8 is a flow diagram showing determining a number of bytes to store in response to the store chunk instruction.

FIG. 8 is a flow diagram illustrating in more detail the determination of the second number of bytes N2 to be stored to memory in response to the store chunk instruction, as described at S122 of FIG. 5. At step S200 the processing circuitry 16 limits the second number of bytes N2 to the maximum possible value supported by the hardware. At step S202 the processing circuitry determines whether the store chunk instruction specifies a destination limit value 78 which imposes a maximum limit on the second number of bytes N2. It is possible that the destination limit value could specify a default predetermined value indicating there is no limit, but if the destination limit value specifies another value other than the default value then at step S204 N2 may be limited to the maximum value indicated by the destination limit value.

Steps S206, S210 and S214 provide similar checks to steps S146, S150, and S154 of FIG. 6, but apply to the destination address instead of the source address. Hence, if within N2 bytes of the destination address, any of a protection boundary, a watchpoint address or an alignment boundary would be crossed, then at steps S208, S212, and S216 the second number of bytes N2 may be limited to prevent the protection boundary, watchpoint address or alignment boundary being crossed, similar to steps S148, S152 or S156 of FIG. 6.

At step S218 the processing circuitry determines whether the source length value indicated in the source length register (e.g. register rn 74 in the case when the same architectural register is specified as both the source length register and the store length register) specifies a number of bytes Ns which is less than the (total) combined size of the one or more store source registers. When the store chunk instruction is used in practice, it would be expected in many cases to follow an earlier load chunk instruction where the source length register 74 is defined to correspond to the same architectural register as the register used as the load length register 64 for the load chunk instruction, so that effectively the source length value indicates the number of bytes loaded to the load destination registers 62. Hence, if the load caused the processing circuitry to load fewer than the maximum possible number of bytes to the load destination register then step S218 ensures that the store instruction does not store to memory bytes passing beyond the bytes that were loaded. Hence, this enables the load and store chunk instructions to implement memory copies of relatively small blocks of memory which are smaller in size than the maximum capacity of the store source registers. Hence, if at step S218 the source length value indicates that Ns is less than Nx (Nx is the total size of the one or more store source registers), then at step S220 the second number of bytes N2 is limited to Ns indicated by the source length value, and no bytes would be stored from the pocket. Even though the source length value indicates a particular number of bytes Ns, the processing circuitry is still allowed to set the second number of bytes N2 as less than Ns if desired based on other constraints such as the checks performed at steps S202 to S216. At step S222 any other implementation-dependent or moment-to-moment conditions or constraints are also applied and the final value of N2 is determined.

If at step S218 it was determined that the store source length value does not specify a number of bytes less than the (total) size of the store source register(s) then all the bytes in the store source register(s) are available for storing to memory. However it is also possible that some valid bytes could be available in the pocket 50 if the pocket is implemented and available. In implementations where the pocket 50 is supported then at step S224 the processing circuitry determines (based on the pocket validity information 51) whether any valid bytes are indicated as available in the pocket and if not then at step S226 the second number of bytes N2 is limited to prevent it exceeding the total combined size of the one or more store source registers. The method then proceeds again to step S222. Even though the source length value may have specified that the full number of bytes in the store source register(s) were available for being stored, this does not necessarily mean that all of those bytes may be stored since there may be other reasons such as a the presence of an imminent protection boundary, watchpoint address or alignment boundary which may limit N2 to less than the total number of bytes in the store source registers.

If valid bytes are indicated as available in the pocket then at step S228, in an implementation where aliasing protection is implemented, the processing circuitry may determine, based on the destination address 70, the source address information previously recorded in response to the load chunk instruction and any pocket valid information 51, whether an aliasing condition is satisfied. This aliasing condition may be a condition which indicates there is a risk that there is an overlap between the source block of memory system locations from which data in the store source register(s) or pocket were loaded in response to an earlier load chunk instruction and the destination block of memory system locations starting at the destination address, at least if the full number of valid bytes indicated as available in the pocket were stored to memory. As mentioned above when an aliasing condition arises, there is a risk that the observed result after performing a memory copy loop may differ on different implementations depending on the size of the pocket implemented and any moment to moment decisions on whether to use the pocket. If this is undesirable then aliasing protection can be implemented, and so if an aliasing condition is satisfied indicating that there is an overlap between a source block of addresses identified based on the source address information and the destination block of addresses identified based on the destination address then at step S226 again the storage of valid bytes may be excluded and so N2 may be limited to prevent it exceeding the total size of the store source register. This does not necessarily exclude the aliasing from happening as there could still be data stored from the store source register data to a memory system location where that data overwrites a value previously read in response to an earlier load chunk instruction. However, by excluding bytes store to the pocket and only considering the data in the store source register it is more likely that consistency between the observed results on different processor implementations can be achieved.

If aliasing protection is not implemented or the aliasing condition is not determined to be satisfied, then at step S230 it is assumed that the processing circuitry is allowed to store data to memory from the pocket, subject to any constraints on the value of N2 already determined. Hence at step S230 N2 is limited based on the number of bytes indicated as valid in the pocket 50 by the valid information 51. Again, N2 is still allowed to be fewer than the maximum permitted based on other constraints. Some implementations may take all N2 bytes from the pocket, while others could take N2-Nx bytes from the pocket 50 and Nx bytes from the store source register(s) rx. Again, at step S222 any other implementation-dependent or moment to moment constraints are applied.

As for FIG. 6, the steps shown in FIG. 8 may be reordered or performed in parallel, and it will be appreciated that not all of the constraints may be implemented for a particular implementation.

Figure 9:
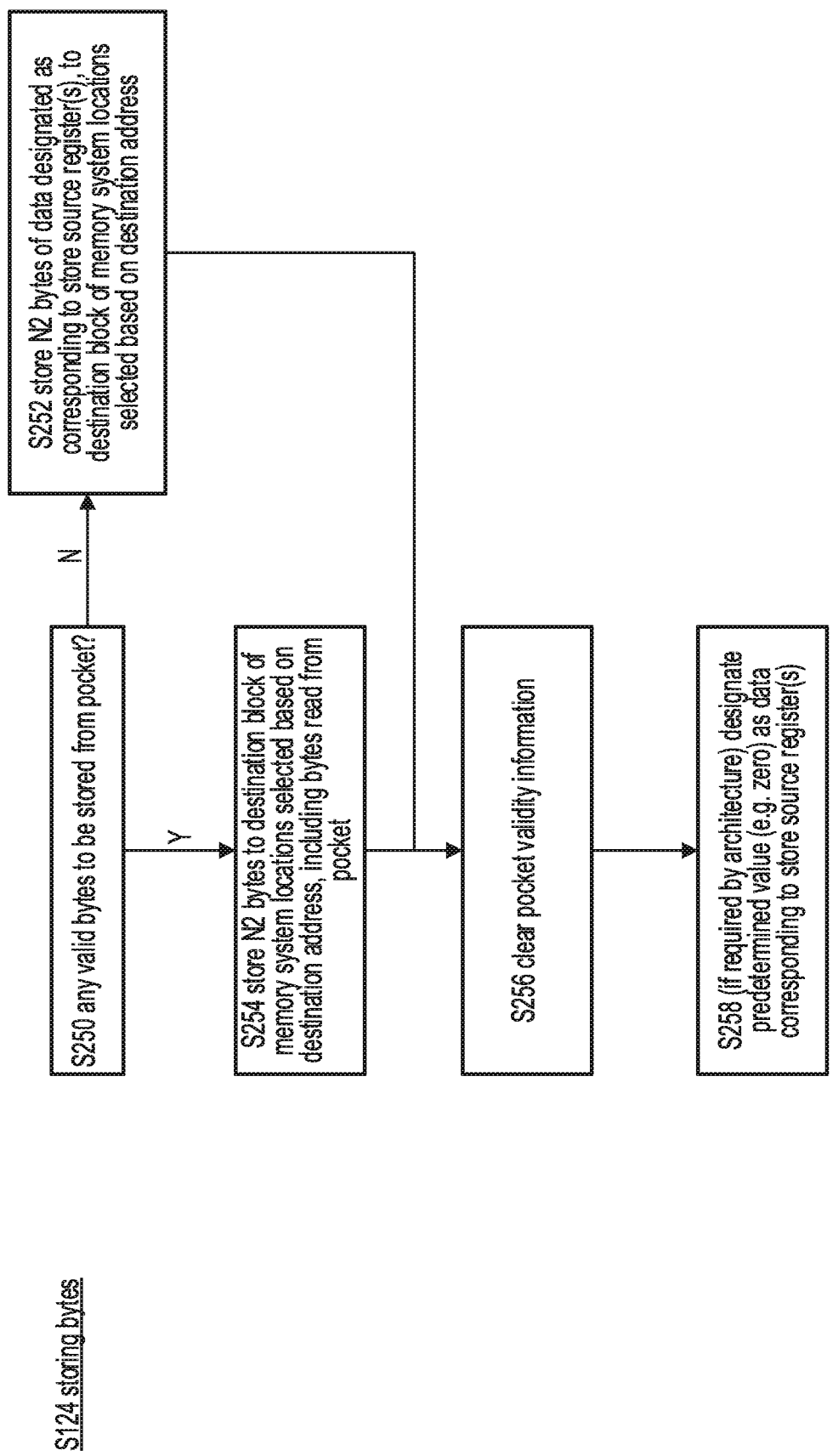
FIG. 9 shows storing of bytes of data to memory in response to the store chunk instruction.

FIG. 9 shows in more detail processing at step S124 of FIG. 5 for controlling storage of the bytes. At step S250 the processing circuitry determines whether any valid bytes are to be stored from the pocket 50 to memory and if not then at step S252 N2 bytes of data designated as corresponding to the one or more store source registers are stored to a destination block of memory system locations selected based on the destination address. On the other hand if any valid bytes are to be stored from the pocket then at step S254 N2 bytes of data are stored to the destination block of memory system locations selected based on the destination address, where the N2 bytes include at least some bytes read from the pocket 50.

Regardless of whether the processing circuitry decided to store any valid bytes from the pocket, at step S256 any pocket validity information 51 is cleared to indicate that there are no longer any valid bytes. This is done even if no bytes were stored from the pocket despite some bytes in the pocket being valid, since if these bytes were not stored then it would be expected that a subsequent iteration of a memory copy loop would then reload those bytes and recreate the pocket later if necessary. Step S256 can be omitted in permutations which do not implement the pocket at all.

At step S258, for some architectural implementations, the processing circuitry 16 may clear the data designated as corresponding to the store source register(s) rx to a predetermined value, such as zero. This is not essential, but by ensuring that, following execution of a store chunk instruction, the store source register(s) are observed as having a predetermined value, this ensures that programmers or compilers will not write any code which relies on those registers continuing to store the data loaded by a previous load chunk instruction. This is useful because it permits some processing implementations to support more efficiently a fused operation which can be performed by the processing circuitry when the instruction decoder 9 detects that a load chunk instruction is followed by a dependent store chunk instruction for which the store source register 72 is the same architectural register as the load destination register 62 of the load chunk instruction and the store source length register 74 is the same architectural register as the load length register 64 of the load chunk instruction. If such a fuse operation is supported then, in response to detecting the sequence including the load chunk and the dependent store chunk instructions, instead of processing these instructions separately as described in the earlier flow diagrams, a fused operation can be performed which combines the effects of these instructions more efficiently, where the fused operation may omit some actions which would not otherwise be observable after the store chunk operation has completed. For example, as the store length value 74 will be designated as corresponding to architectural register rn and this may be observed as overwriting the load length value written to rn in response to the load chunk instruction, then in a fused operation there is no need to generate the load length value and designate it as corresponding to the load length register rn. Instead, the processing circuitry in the fused operation can determine the total number of bytes to be copied from the source block of memory system locations to the destination block of system memory locations based on a combination of the constraints indicated in FIGS. 6 and 8 and then simply implement the copy of those bytes of data without necessarily providing a record in architecturally visible state of temporary state passed between the instructions. Also, in the fused operation it may not be essential for the data loaded as indicated by the load chunk instruction to actually be designated as corresponding to a load destination register 62 since in the event that the store source register(s) rx would be cleared to a predetermined value in response to the store instruction as shown in step S258 then its loaded data would not subsequently be visible architecturally. This may free up the processing circuitry to use more efficient ways of copying the data between memory, such as loading the data into buffer maintained by the load/store unit 28 from which the data can then be stored to memory, or having structures deeper in the memory system fabric which can implement the memory copies without the data needing to be forwarded up to the processing pipeline or registers 14 and then stored back to memory. Hence, it can be useful to implement step S258 to permit greater flexibility in instruction fusion.

Other Functions

The above examples have discussed use of the load chunk and store chunk instructions for implementing memory copy functions, but these instructions can also be used to support other library functions in C. In some cases the program may only use one of the load chunk and store chunk instructions rather than using them both in combination as shown in the examples below.

memset( )

This needs STCH to store an arbitrary length chunk, writing repeats of the data in X. Zeroes could be stored by making XZR the work register. There are at least two ways to do a store-only loop that stores arbitrary-sized chunks:

(1) have a variant of STCH defined to duplicate the value in the initial lane of X:

```
memset:
    add dst_limit, dst, len
    ; value to be stored is in low byte of rx
loop:
    stchdup.b rx, dst_limit, [dst]!
    blt loop
```

Figure 10:
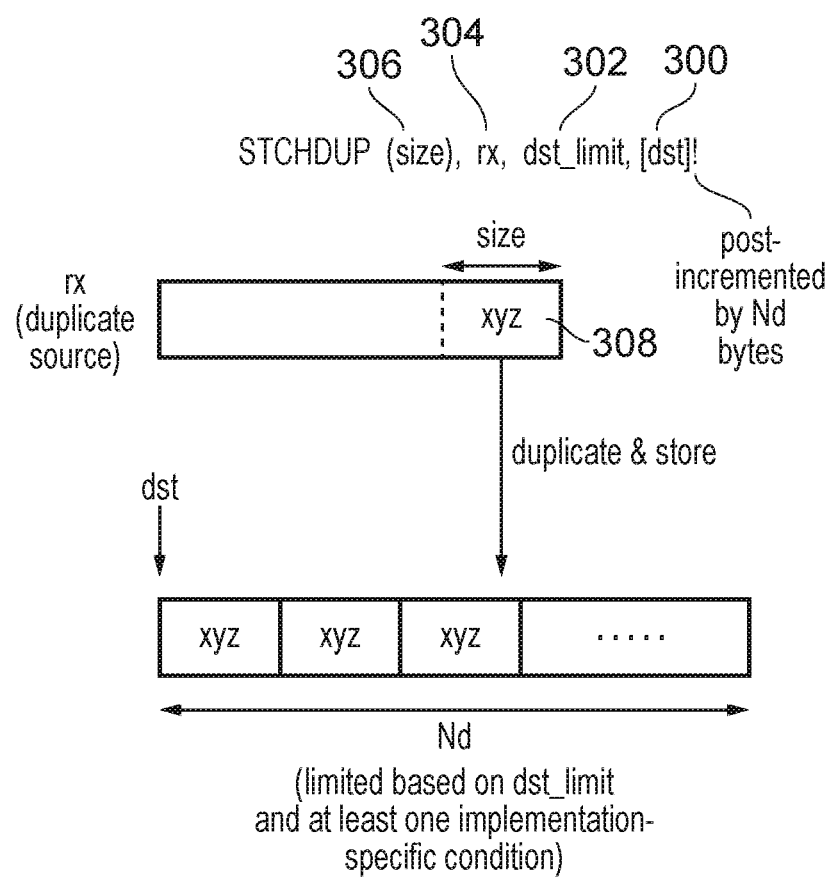
FIG. 10 illustrates an example of a duplicating store chunk instruction.

As shown in FIG. 10, a duplicating store chunk instruction STCHDUP specifies a duplicate destination address 300, a destination limit 302, and one or more duplicate source registers 304. In response to STCHDUP, the instruction decoder 9 controls processing circuitry 4 to store, to a block of memory system locations selected based on the duplicate destination address 300, two or more repetitions of a bit sequence 308 selected from within the data designated as corresponding to the duplicate source register(s) rx. The size Nd of the duplicate destination block of memory system locations may be selected based on at least one implementation-specific condition (e.g. based on address alignment) as well as other constraints such as those shown in FIG. 8. In some examples, the size of the bit sequence 308 may be implicit (e.g. one byte). Other examples may support the STCHDUP instruction specifying a size value 306 which specifies the size of the bit sequence to be copied. The STCHDUP instruction may also control the processing circuitry to increment the destination address 300 by Nd, the number of bytes filled with the repetitions of the bit sequence 308.

(2) have a "duplicate value to X and pocket" instruction:

```
memset:
    add dst_limit, dst, len
loop:
    dupch.b rx, rn
    stch rx, rn, dst_limit, [dst]!
    blt loop
```

Figure 11:
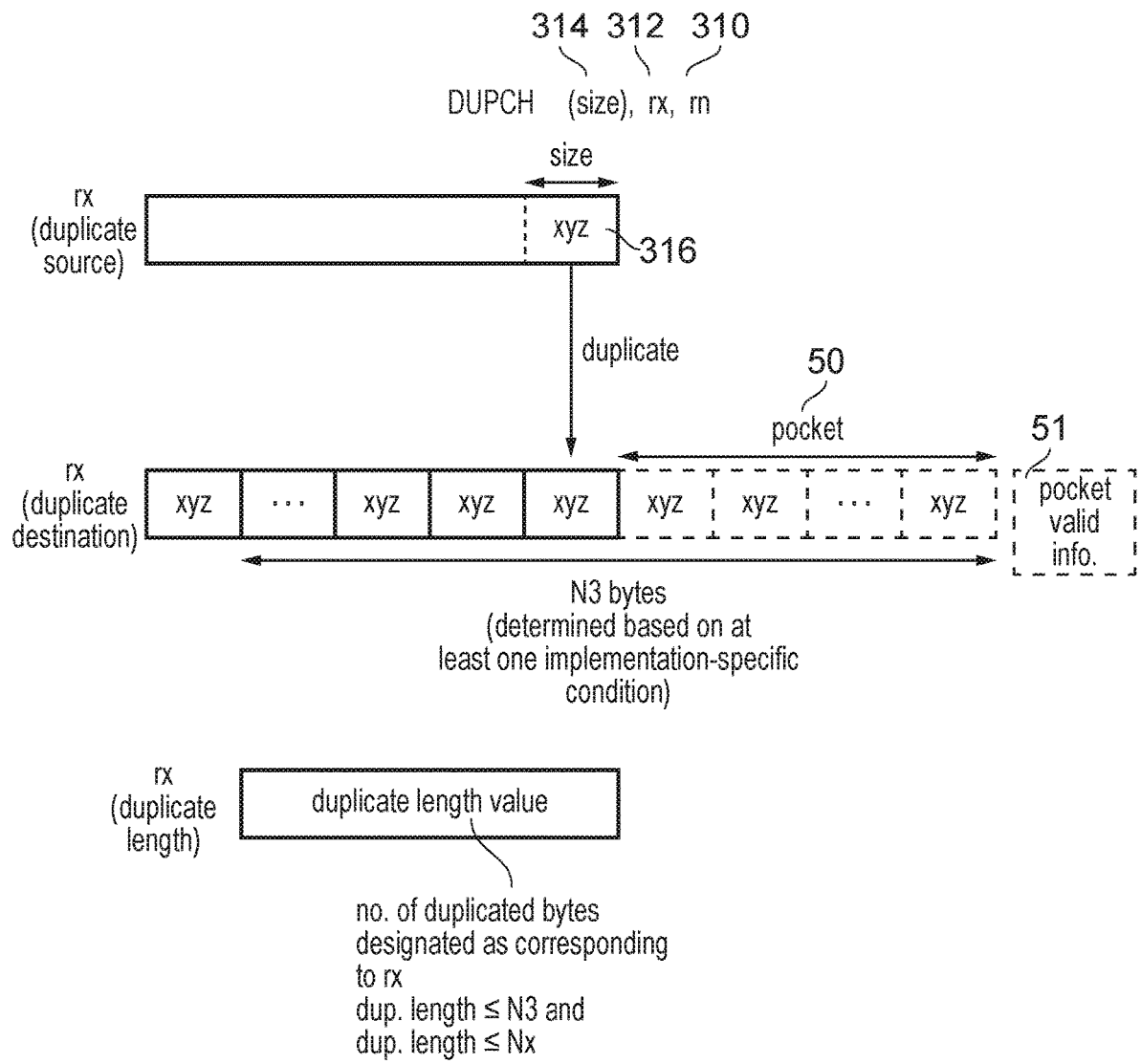
FIG. 11 illustrates an example of a duplicate chunk instruction.

As shown in FIG. 11, the duplicate chunk instruction DUPCH specifies a duplicate length register rn 310, a duplicate source register rx 312, and a duplicate destination register rx (which in this example is the same architectural register 312 as the duplicate source register). In response to DUPCH, the instruction decoder 9 controls processing circuitry 10 to determine, based on at least one implementation-specific condition, a third number 316 of bytes N3 representing a data size within which to duplicate a target bit sequence selected from data designated as corresponding to the duplicate source register rx. The processing circuitry 10 duplicates the target bit sequence to form duplicated data having a size corresponding to said third number of bytes, and designates at least a portion of duplicated data as data corresponding to the architecturally visible duplicate destination register rx. The processing circuitry 10 also designates a duplicate length value as data corresponding to the duplicate length register rn, the duplicate length value indicative of a number of bytes which is less than or equal to N3 and which is also less than or equal to a number of bytes corresponding to a total size of the at least one duplicate destination register Nx. Optionally, DUPCH could specify a size parameter 314 to allow the size of the duplicated bit sequence to be varied (otherwise, the size may be implicit, e.g. one byte). Similar to load chunk, the DUPCH instruction may support use of the pocket 50 to duplicate the bit sequence 316 in the pocket and set the validity information 51 to indicate valid bytes copied to the pocket, so that implementations supporting the pocket 50 may fill a greater number of bytes with copies of bit sequence 316 than implementations not having or not currently using the pocket 50. As shown above, a subsequent store chunk instruction (behaving the same as described earlier) can then control storage of the copied bytes of data to memory.

The second variant has slightly more RISC-like semantics but has to recreate the pocket every time (even if we hadn't defined STCH to invalidate the pocket, it may be invalidated at any time for other reasons). We could refine STCH to tell us (after the fact) if the pocket is empty:

```
memset:
    add dst_limit, dst, len
```

```
dloop:
    dupch.b rx, rn
loop:
    stch rx, rn, dst_limit, [dst]!
    bvs dloop
    blt loop
```

Although memset( ) stores bytes, for versatility, we might want to allow stores of other power-of-two sizes, as the "duplicate value across all lanes" hardware is probably already there in the pipeline. This can help support for initializing memory to repeating patterns of values where not all bytes in the repeated pattern are the same.

memcmp( )

As before, we loop through chunks. There are different ways to do this:

(1) one LDCH and a "Load and Compare Chunk" instruction, which compares the loaded chunk directly against data in memory. This can be defined to not access memory in the second buffer beyond the first non-matching byte.

This can work like this:

```
memcmp:
loop:
    ldch rx, rn, srca_limit, [srca]
    cmpch rx, rn, [srcb]!
    add srca, srca, rn
    bne mismatch
    cmp srca, srca_limit
    blt loop
```

Figure 12:
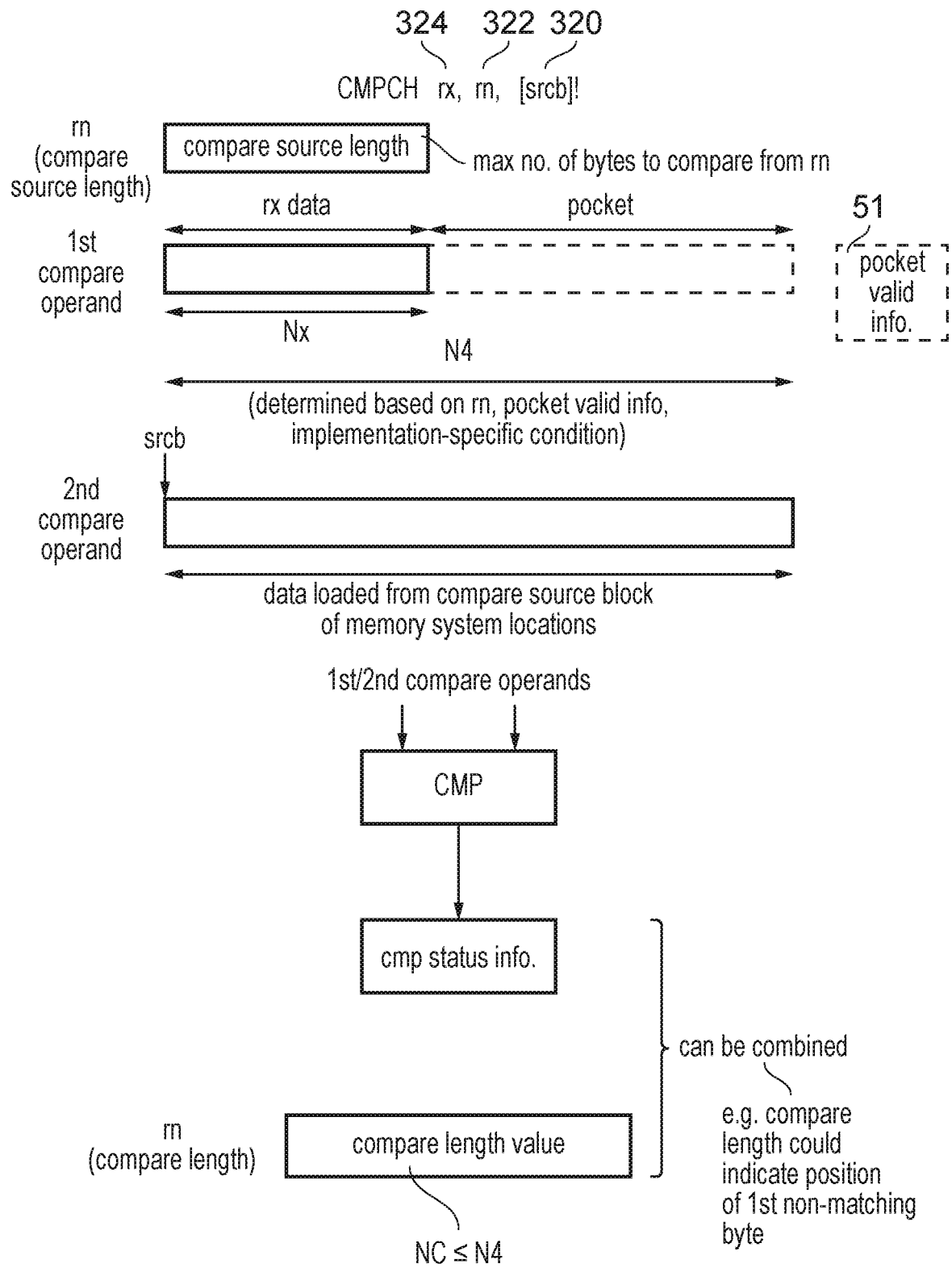
FIG. 12 illustrates an example of a compare chunk instruction for which a second compare operand is loaded from a compare source block of memory system locations.

As shown in FIG. 12, the compare chunk instruction CMPCH specifies a source address 320, a compare length register 322 and at least one first compare operand register 324. In response to CMPCH, the instruction decoder 9 controls the processing circuitry 4 to determine, based on at least one implementation-specific condition, a fourth number of bytes N4 indicating how many bytes of data are to be compared. N4 is limited to a maximum of N, the value in register rn (which may correspond to the load length value generated by the earlier ldch instruction). The processing circuitry 4 sets comparison status information (e.g. status flags in control registers 27) depending on a comparison between a first compare operand and a second compare operand, which each having a size corresponding to N4 bytes. At least a portion of the first compare operand comprises data designated as corresponding to the at least one architecturally visible first compare operand register (again, it is possible that bytes of the first compare operand may also be obtained from the pocket 50, if the pocket validity information 51 set by the load chunk instruction specifies valid bytes). The second compare operand comprises N4 bytes of data loaded from a compare source block of memory system locations identified based on the source address 320. The processing circuitry 4 designates a compare length value as data corresponding to the compare length register rn, the load length value indicating a number of bytes which is less than or equal to N4.

Hence, in response to CMPCH the processing circuitry 4 compares between 1 and N bytes of rx (or the pocket) with the data in the memory at SRCB. It sets rn to the number of bytes NC that were compared and found to be equal (NC is less than or equal to N4). It sets flags in status registers 27 indicating whether a mismatch occurred (i.e. two bytes were compared and found to be unequal) and might also set flags indicating if it has reached the end of the buffer. As with STCH, CMPCH may terminate early e.g. due to a page boundary, so that the next LDCH might re-load some of its previously loaded data.

Figure 13:
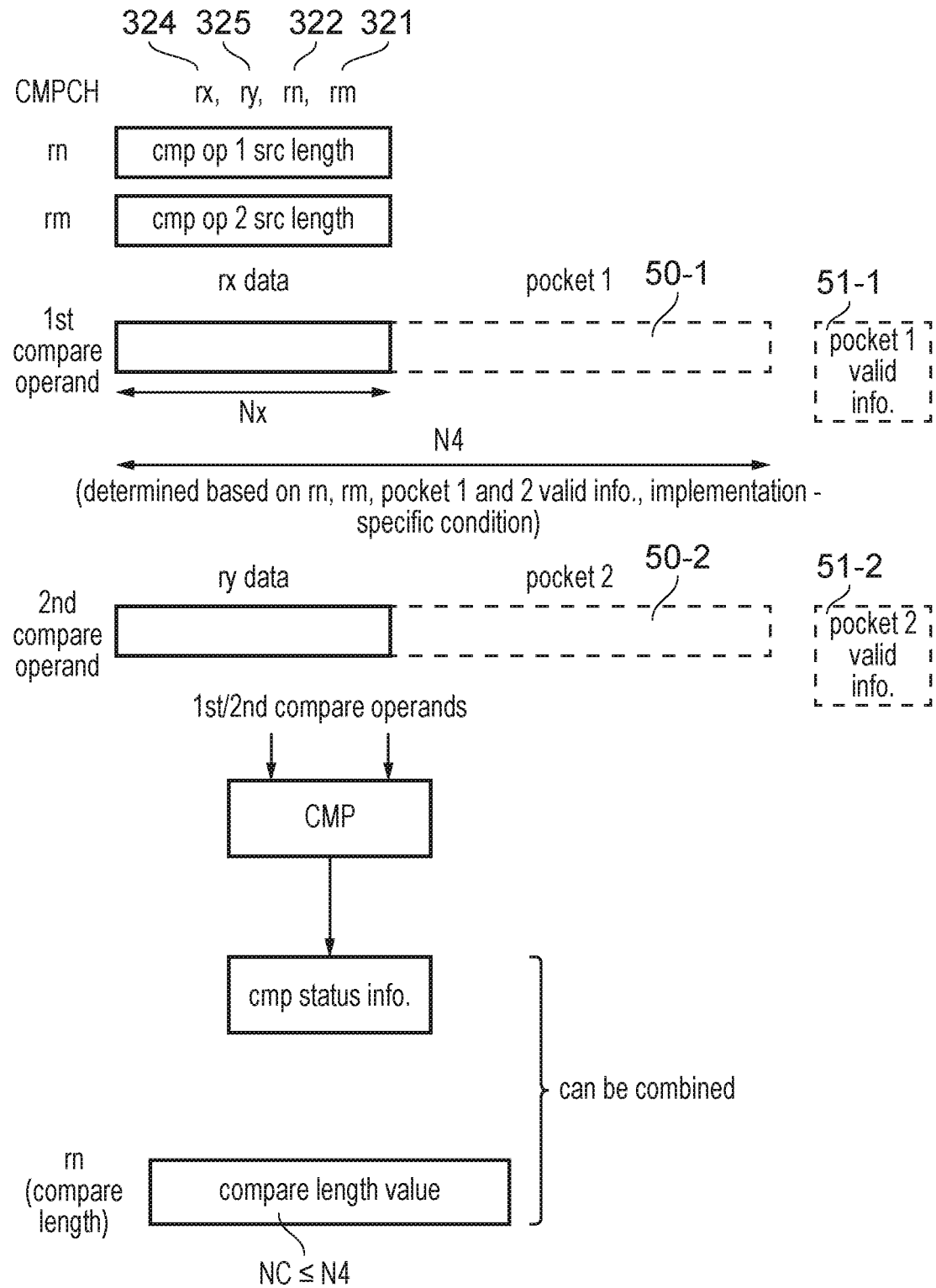
FIG. 13 shows an example of a compare chunk instruction for which the second compare operand is obtained from data designated as corresponding to at least one architecturally visible second compare operand register.

(2) Two LDCH's and a "Compare Chunks in Registers" instruction. As shown in FIG. 13, this is a second variant of the CMPCH instruction which operates similar to the instruction shown in FIG. 12, except that the second compare operand is now defined in a second compare operand register ry 325 instead of loaded from memory in response to CMPCH itself, and a second compare length register rm 321 is defined separate from rn, to allow the fourth number of bytes N4 to be compared to be limited based on the load length values defined by the two earlier load chunk instructions which load the first and second compare operands. If using pockets, we would need two of them (with first/second pocket validity information as shown in FIG. 13). The comparison instruction would be limited to comparing the minimum of the two sizes defined in registers rn, rm (i.e. if the loads had loaded different sized chunks, some of the data would be wasted and have to be loaded again next time). Both loads might access past the first non-matching byte, but not encounter protection faults. Nevertheless, the bytes to be compared could also be limited based on other implementations-specific conditions. Again, the number of bytes compared (or an indication of the position of the first matching or non-matching byte) could be indicated using the compare length value in rn.

A variant of CMPCH that compares up to a zero may be useful for supporting strcmp( ) functions in C.

memmove( )

This is defined to copy source to destination as if via an intermediate buffer. If they are non-overlapping it can use the same code as memcpy( ). If they overlap, with the destination at a lower address, an ascending copy loop will work correctly, even with the "pocket". If they overlap, with the destination at a higher address, a different strategy should be used, e.g. a descending copy, using standard instructions. An instruction could be defined, that would quickly check the different cases of overlap.

strlen( )

This is LDCH followed by an instruction that searches for a zero byte within the N bytes of X (or the pocket). The C function doesn't take a length, so what should the initial length for LDCH be? Because of LDCH's behaviour of not trapping except on the base address, we can call it with an arbitrary length, and each chunk will read (at most) up to the next protection boundary. So we only get a protection fault if we haven't already found a zero byte.

```
strlen:
   mov len, #0
loop:
   ldch rx, rn, xzr, [src] ; no source limit
   fndch rx, rn, #0; set n to position past first 0 or number of characters scanned; set Z if 0 found
   add len, len, rn
   add src, src, rn
   bne loop
   sub rn, rn, #1
   ret
```

Figure 14:
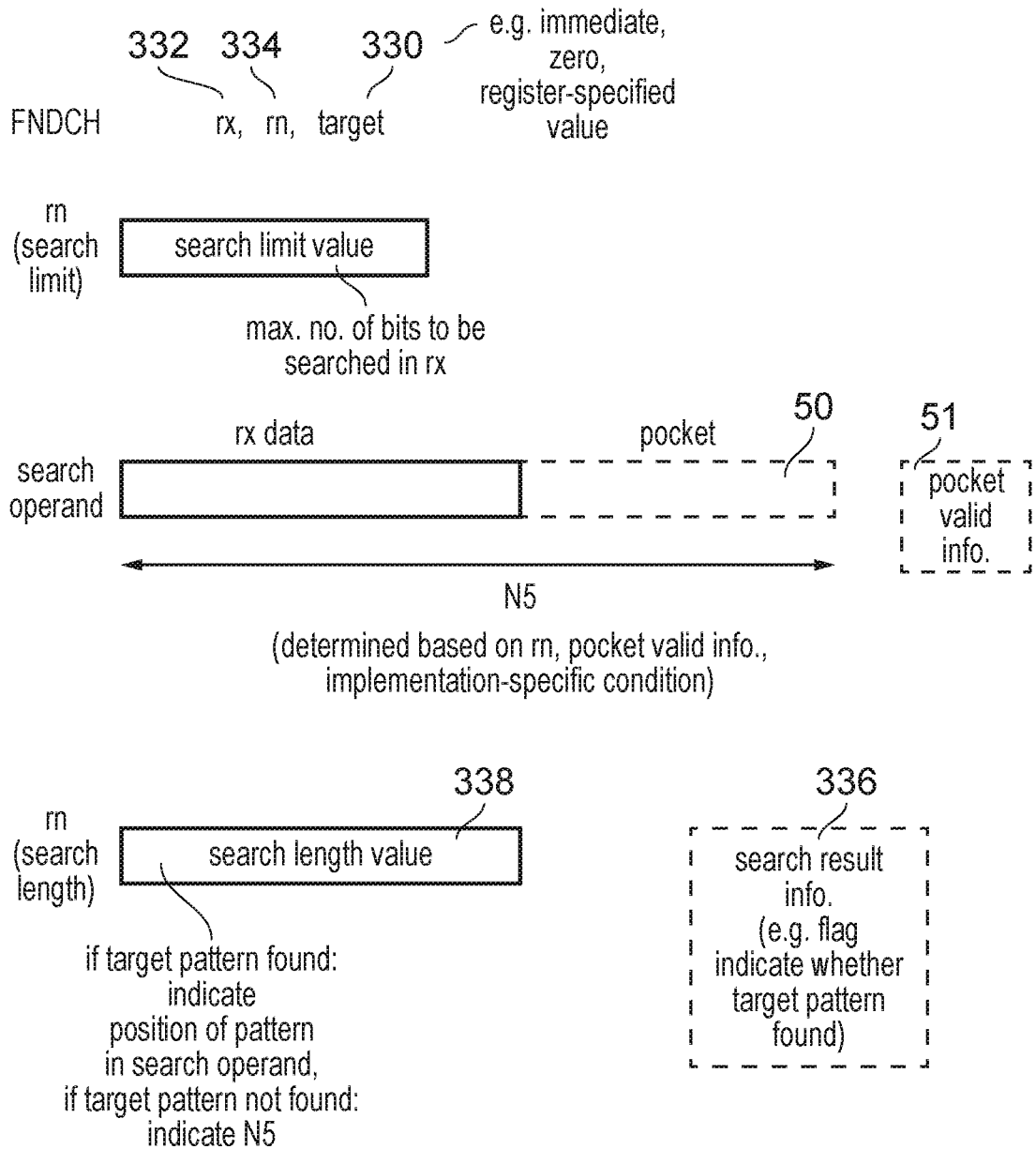
FIG. 14 illustrates an example of a find chunk instruction.

Hence, as shown in FIG. 14, a search chunk instruction FNDCH specifies a target bit pattern 330 to be searched for (in the example above, the target bit pattern is defined as an immediate value of 0, but other examples could specify other immediate values or could use a register to specify the target bit pattern). Some implementations could also define the target bit pattern implicitly (e.g. an instruction may be restricted to finding a target bit pattern of zero). FNDCH also specifies a search operand register rx 332 and a search length register rn 334. The search length register may also function as a search limit register defining a search limit value which limits the maximum number of bytes within which the search is to be performed (e.g. this may be set by an earlier ldch instruction). In response to FNDCH, the instruction decoder 9 controls the processing circuitry 4 to determine, based on at least one implementation-specific condition, a fifth number of bytes N5 indicating how many bytes of data within the search operand are to be searched for a target bit pattern. The search operand is data including data designated as corresponding to the at least one architecturally visible search operand register, but could also include valid bytes indicated by pocket validity information 51 as being valid in the pocket. The processing circuitry 4 sets search result information 336 (e.g. condition status flags in status registers 27) depending on whether the target bit pattern is found within the search operand, and designates a search length value 338 as data corresponding to the search length register rn 334, the search length value indicating a position of the target bit sequence in a case when the target bit pattern is found (this value should be less than or equal to the fifth number of bytes). In the case where the target bit pattern is not found, the search length value indicates the number of bytes N5 searched so that a subsequent iteration of the loop can continue searching for the bit pattern in a further chunk of bytes. In some implementations, it can be useful to define FNDCH so that the search length value 338 (in the case where the target bit pattern is found) is set to the length inclusive of the found zero as this makes it more useful in strcpy( )—see below.

strcpy( )

This function can be defined using similar techniques to memcpy( ) and strlen( )—load chunk, test for zero byte, store chunk and terminate:

```
strcpy:
loop:
   ldch rx, rn, xzr, [src] ; no source limit
   fndch rx, rn, #0 ; set n to position past first 0 or number of characters scanned; set Z if 0 found
   stch rx, rn, [dst]!
   add src, src, rn
   bne loop
```

The fndch instruction is as discussed above for FIG. 14. Even if we find a zero in the current chunk, we don't necessarily store all the bytes up to that zero, because the store might page-fault earlier. In that case we loop round and load the remaining bytes and scan them again. So the flags after STCH indicate not just whether a zero was found but whether it was actually stored.

Alternatively we could have a STCHZ defined as "store up to and including first zero byte", setting a "zero" status flag Z if zero was stored so that a subsequent "branch if not equal" instruction may control the branch back to the start of the loop:

```
strcpy:
  loop:
    ldch rx, rn, xzr, [src]
    stchz rx, rn, [dst]!
    add src, src, rn
    bne loop
```

Instruction Encodings

The above proposals add a handful of instructions (LDCH, STCH, STCHZ, CMPCH, FNDCH . . . ) each taking up to 4 registers, so using 22 or 23 bits for encoding. Some space could be saved by using implicit register encodings, e.g. base and limit could be a consecutive register pair. For LDCH, we could use the same register name for the input (it might make more sense as a length) and output (length actually read). Buffer sizes could be encoded as a length or as a limit address. If encoding it as a length then we increase the base and decrease the length every iteration, so it's one more instruction per iteration, but probably not on the critical path.

Simulator Example

Figure 15:
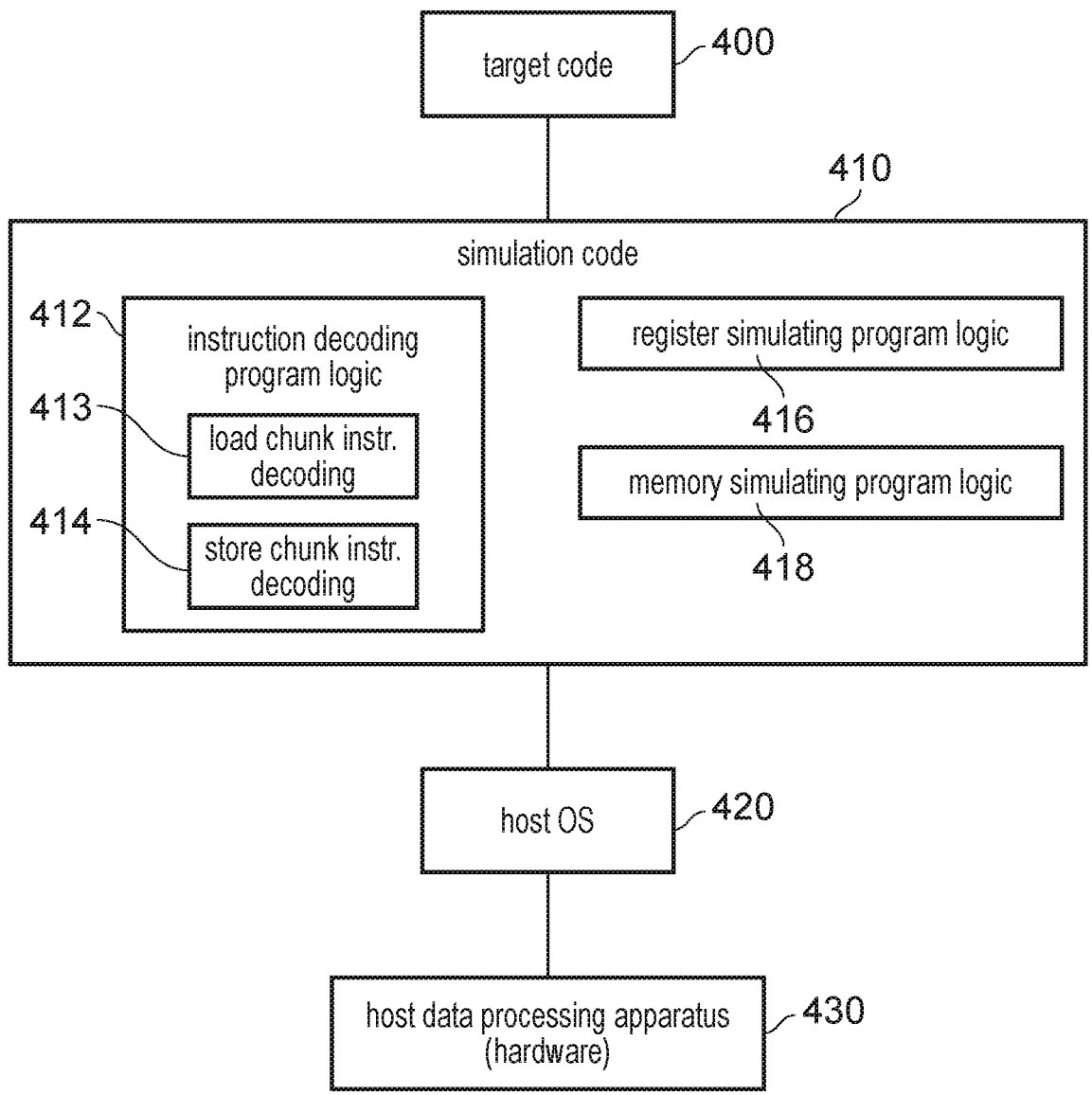
FIG. 15 shows a simulation example that may be used.

FIG. 15 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 430, optionally running a host operating system 420, supporting the simulator program 410. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or re-use reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, Pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 430), some simulated embodiments may make use of the host hardware, where suitable.

The simulator program 410 may be stored on a computer-readable storage medium (which may be a non-transitory medium), and provides a program interface (instruction execution environment) to the target code 400 (which may include applications, operating systems and a hypervisor) which is the same as the interface of the hardware architecture being modelled by the simulator program 410. Thus, the program instructions of the target code 400, including load chunk, store chunk and the other instructions described above, may be executed from within the instruction execution environment using the simulator program 410, so that a host computer 430 which does not actually have the hardware features of the apparatus 2 discussed above can emulate these features.

The simulator program 410 may have instruction decoding program logic 412 which comprises instructions which check the instruction encoding of program instructions of the target code 400, and map each type of instruction onto a corresponding set of one or more program instructions in the native instruction set supported by the host hardware 430 which implement corresponding functionality to that represented by the decoded instruction. The instruction decoding program logic 412 includes load chunk instruction decoding program logic 413 for decoding load chunk instructions as discussed above and store chunk instruction decoding program logic 414 for decoding store chunk instructions as discussed above. Some implementations of the simulation could choose to emulate the use of the pocket storage circuitry 50, while others may restrict the load/store chunk operations to the architecturally visible state defined in the instruction set architecture used for the target code 400.

The simulator program 410 also includes register simulating program logic 314 which may comprise sets of instructions which maintain a register simulating data structure in host storage (e.g. the virtual address space of the host data processing apparatus 430 or registers of the host data processing apparatus 430). The register simulating data structure represents the register contents of the registers 14 which the target code expects to be provided in hardware, but which may not actually be provided in the hardware of the host apparatus 430. Instructions in the target code 400, which in the simulated instruction set architecture which are expected to reference certain registers, may cause the register simulating program logic 416 to generate load/store instructions in the native instruction set of the host apparatus, to request reading/writing of the corresponding simulated register state from the register simulating data structure stored in the memory of the host apparatus. Similarly, the simulation program 410 may include memory simulating program logic 418 to implement virtual-to-physical address translation (based on page table data) between the virtual address space used by the target code 400 and a simulated physical address space which, from the point of view of the target code 400 is expected to refer to actual physical memory storage, but which in reality is mapped by memory simulating program logic 418 to regions of virtual addresses within the virtual address space used by the real host data processing apparatus 430 (which may itself then be subject to further address translation into the real physical address space used to reference the host memory).

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope of the invention as defined by the appended claims.

The invention claimed is:

1. An apparatus comprising:
an instruction decoder to decode instructions; and
processing circuitry to perform data processing in response to the instructions decoded by the instruction decoder; in which:
in response to the instruction decoder decoding a load chunk instruction specifying a source address, at least one architecturally visible load destination register, and an architecturally visible load length register, the processing circuitry is configured to:
determine, based on at least one implementation-specific condition, a first number of bytes indicative of how many bytes of data to load from a memory system in response to the load chunk instruction;
load data from a source block of memory system locations selected based on the source address and designate at least a portion of the loaded data as data corresponding to the at least one architecturally visible load destination register, the source block of memory system locations having a size corresponding to the first number of bytes; and
designate a load length value as data corresponding to the architecturally visible load length register, the load length value indicative of a number of bytes which is less than or equal to the first number of bytes and which is also less than or equal to a number of bytes corresponding to a total size of the at least one architecturally visible load destination register; and
in response to the instruction decoder decoding a store chunk instruction specifying a destination address, at least one architecturally visible store source register, and an architecturally visible store length register, the processing circuitry is configured to:
determine, based on at least one implementation-specific condition, a second number of bytes indicative of how many bytes of data to store to the memory system in response to the store chunk instruction;
store data, at least a portion of which is data designated as corresponding to the at least one architecturally visible store source register, to a destination block of memory system locations determined based on the destination address, the destination block of memory system locations having a size corresponding to the second number of bytes; and
designate a store length value indicative of the second number of bytes as data corresponding to the architecturally visible store length register.

2. The apparatus according to claim 1, in which the processing circuitry is configured to permit the source address and the destination address to be unaligned with respect to an alignment boundary.

3. The apparatus according to claim 1, in which the processing circuitry is configured to permit the load length value and the store length value to indicate a number of bytes other than a power of 2.

4. The apparatus according to claim 1, in which the store chunk instruction specifies an architecturally visible source length register, and in response to the store chunk instruction, the processing circuitry is configured to constrain how many bytes of the portion of data designated as corresponding to the at least one architecturally visible store source register are to be stored to the destination block of memory system locations, to be less than or equal to a number of bytes indicated by a source length value designated as corresponding to the architecturally visible source length register.

5. The apparatus according to claim 4, in which the processing circuitry is configured to allow the second number of bytes to be less than the number of bytes specified by the source length value.

6. The apparatus according to claim 4, in which in response to the instruction decoder decoding a sequence of instructions including the load chunk instruction followed by a dependent store chunk instruction for which the architecturally visible source length register corresponds to the architecturally visible load length register of the load chunk instruction and the at least one architecturally visible store source register corresponds to the at least one architecturally visible load destination register, the processing circuitry is configured to perform a fused operation to:
copy a given number of bytes of data from a first block of memory system locations selected based on the source address to a second block of memory system locations selected based on the destination address, the given number of bytes selected based on at least one implementation-specific condition; and
designate a value indicative of the given number of bytes as data corresponding to the architecturally visible store length register.

7. The apparatus according to claim 1, in which:
in response to the load chunk instruction, the processing circuitry is configured to support loading to a pocket storage region at least one byte of data loaded from the source block of memory system locations other than the portion of data corresponding to the at least one architecturally visible load destination register;
in response to the store chunk instruction, the processing circuitry is configured to support storing at least one byte of data, other than the portion of data designated as corresponding to the at least one architecturally visible store source register, from the pocket storage region to the destination block of memory system locations.

8. The apparatus according to claim 7, in which, when the processing circuitry loads the at least one byte of data to the pocket storage region in response to the load chunk instruction, the processing circuitry is configured to set the load length value with the at least one byte loaded to the pocket storage region excluded from the first number of bytes indicated using the load length value; and
when the processing circuitry stores the at least one byte of data from the pocket storage region in response to the store chunk instruction, the processing circuitry is configured to set the store length value with the at least one byte stored from the pocket storage region included in the second number of bytes indicated using the store length value.

9. The apparatus according to claim 7, in which:
when the processing circuitry loads the at least one byte of data to the pocket storage region in response to the load chunk instruction, the processing circuitry is configured to set validity information indicative of validity of the at least one byte loaded to the pocket storage region in response to the load chunk instruction; and
in response to the store chunk instruction, the processing circuitry is configured to determine, based on the validity information, whether to store to the destination block of memory system locations any valid bytes of data read from the pocket storage region.

10. The apparatus according to claim 9, in which the processing circuitry is configured to clear or invalidate the validity information in response to at least one of:
an exception; and
processing of a store chunk instruction or other instruction capable of causing the processing circuitry to consume at least one valid byte of data read from the pocket storage region.

11. The apparatus according to claim 7, in which the processing circuitry is configured to prevent data being loaded to the pocket storage region when a protection attribute associated with a memory region including the source address specifies that the memory region is a device type of memory region for which repeating a same memory multiple times risks causing a side effect different from an effect caused when that memory access is only performed once.

12. The apparatus according to claim 7, in which the at least one implementation-specific condition is dependent on at least one of:
a size of the pocket storage region; and
available storage capacity of the pocket storage region.

13. The apparatus according to claim 7, in which in response to the load chunk instruction, the processing circuitry is configured to record source information indicative of the source address; and
in response to the store chunk instruction, the processing circuitry is configured to exclude the data in the pocket storage region from the second number of bytes to be stored to the memory system in response to the store chunk instruction, when it is determined that an aliasing condition is satisfied by the destination address and the source address indicated by the source information.

14. The apparatus according to claim 1, in which the at least one implementation-specific condition comprises an address alignment condition dependent on relative alignment of the source address or the destination address with respect to an alignment boundary.

15. The apparatus according to claim 1, in which:
in response to the load chunk instruction, the processing circuitry is configured to determine the first number of bytes based on the at least one implementation-specific condition and a source limit value specified by the load chunk instruction, the source limit value indicative of a maximum limit for the first number of bytes; and
in response to the store chunk instruction the processing circuitry is configured to determine the second number of bytes based on the at least one implementation-specific condition and a destination limit value specified by the store chunk instruction, the destination limit value indicative of a maximum limit for the second number of bytes.

16. The apparatus according to claim 15, in which in response to the load chunk instruction, the processing circuitry is configured to prefetch, into a data cache, data associated with a further block of memory system locations other than the source block of memory system locations, where the processing circuitry is configured to select the further block of memory system locations based on the source limit value.

17. The apparatus according to claim 1, comprising:
memory access control circuitry to control access to memory based on protection information defined in a protection table comprising a plurality of protection entries associated with respective memory regions; in which:
in response to the load chunk instruction, the processing circuitry is configured to limit the first number of bytes to prevent the source block of memory system locations crossing a protection boundary between memory regions associated with different protection entries; and
in response to the store chunk instruction, the processing circuitry is configured to limit the second number of bytes to prevent the destination block of memory system locations crossing a protection boundary between memory regions associated with different protection entries.

18. The apparatus according to claim 1, comprising watchpoint monitoring circuitry to signal an exception when a target address of a memory access requested by the processing circuitry corresponds to a watchpoint address; in which:
in response to the load chunk instruction, when the source address is an address other than the watchpoint address, the processing circuitry is configured to limit the first number of bytes to prevent the source block of memory system locations crossing the watchpoint address; and
in response to the store chunk instruction, when the destination address is an address other than the watchpoint address, the processing circuitry is configured to limit the second number of bytes to prevent the destination block of memory system locations crossing the watchpoint address.

19. The apparatus according to claim 1, in which in response to the store chunk instruction, the processing circuitry is configured to designate a predetermined value as data corresponding to the at least one architecturally visible store source register.

20. The apparatus according to claim 1, in which in response to the instruction decoder decoding a duplicating store chunk instruction specifying a duplicate destination address and at least one architecturally visible duplicate source register, the processing circuitry is configured to store, to a duplicate destination block of memory system locations selected based on the duplicate destination address, a plurality of repetitions of a bit sequence selected from within the data designated as corresponding to the at least one architecturally visible duplicate source register, where the processing circuitry is configured to determine a size of the duplicate destination block of memory system locations based on at least one implementation-specific condition.

21. The apparatus according to claim 1, in which in response to the instruction decoder decoding a duplicate chunk instruction specifying an architecturally visible duplicate length register, an architecturally visible duplicate source register and an architecturally visible duplicate destination register, the processing circuitry is configured to:
determine, based on at least one implementation-specific condition, a third number of bytes representing a data size within which to duplicate a target bit sequence selected from data designated as corresponding to the architecturally visible duplicate source register;
duplicate the target bit sequence to form duplicated data having a size corresponding to said third number of bytes;
designate at least a portion of duplicated data as data corresponding to the architecturally visible duplicate destination register; and
designate a duplicate length value as data corresponding to the architecturally visible duplicate length register, the duplicate length value indicative of a number of bytes which is less than or equal to the third number of bytes and which is also less than or equal to a number of bytes corresponding to a total size of the at least one architecturally visible duplicate destination register.

22. The apparatus according to claim 1, in which in response to the instruction decoder decoding a compare chunk instruction specifying at least one architecturally visible first compare operand register and an architecturally visible compare length register, the processing circuitry is configured to:
determine, based on at least one implementation-specific condition, a fourth number of bytes indicative of how many bytes of data are to be compared;
set comparison status information depending on a comparison between a first compare operand and a second compare operand, the first compare operand and the second compare operand each having a size corresponding to the fourth number of bytes, where at least a portion of the first compare operand comprises data designated as corresponding to the at least one architecturally visible first compare operand register; and
designate a compare length value as data corresponding to the architecturally visible compare length register, the load length value indicative of a number of bytes which is less than or equal to the fourth number of bytes; and
the second compare operand comprises one of:
data, at least a portion of which is data designated as corresponding to at least one architecturally visible second compare operand register specified by the compare chunk instruction; and
data loaded in response to the compare chunk instruction from a compare source block of memory system locations selected based on a compare source address specified by the compare chunk instruction.

23. The apparatus according to claim 1, in which, in response to the instruction decoder decoding a search chunk instruction specifying at least one architecturally visible search operand register and an architecturally visible search length register, the processing circuitry is configured to:
determine, based on at least one implementation-specific condition, a fifth number of bytes indicative of how many bytes of data within a search operand are to be searched for a target bit pattern, the search operand comprising data including data designated as corresponding to the at least one architecturally visible search operand register;
set search result information depending on whether the target bit pattern is found within the search operand; and
designate a search length value as data corresponding to the architecturally visible search length register, the search length value indicative of a position of the target bit sequence in a case when the target bit pattern is found, and indicative of a value less than or equal to the fifth number of bytes.

24. A method comprising:
in response to decoding of a load chunk instruction specifying a source address, at least one architecturally visible load destination register, and an architecturally visible load length register:
determining, based on at least one implementation-specific condition, a first number of bytes indicative of how many bytes of data to load from a memory system in response to the load chunk instruction;
loading data from a source block of memory system locations selected based on the source address, the source block of memory system locations having a size corresponding to the first number of bytes, and designating at least a portion of the loaded data as data corresponding to the at least one architecturally visible load destination register; and
designating a load length value as data corresponding to the architecturally visible load length register, the load length value indicative of a number of bytes which is less than or equal to the first number of bytes and which is also less than or equal to a number of bytes corresponding to a total size of the at least one architecturally visible load destination register; and
in response to decoding of a store chunk instruction specifying a destination address, at least one architecturally visible store source register, and an architecturally visible store length register:
determining, based on at least one implementation-specific condition, a second number of bytes indicative of how many bytes of data to store to the memory system in response to the store chunk instruction;
storing data, at least a portion of which is data designated as corresponding to the at least one architecturally visible store source register, to a destination block of memory system locations determined based on the destination address, the destination block of memory system locations having a size corresponding to the second number of bytes; and
designating a store length value indicative of the second number of bytes as data corresponding to the architecturally visible store length register.

25. A non-transitory computer-readable storage medium storing a computer program to control a host data processing apparatus to provide an instruction execution environment for execution of target code; the computer program comprising:
instruction decoding program logic to decode instructions of the target code to control the host data processing apparatus to perform data processing in response to the instructions of the target code, the instruction decoding program logic comprising:
load chunk instruction decoding program logic to decode a load chunk instruction specifying a source address, at least one architecturally visible load destination register, and an architecturally visible load length register, and in response to the load chunk instruction to control the host data processing apparatus to:
determine, based on at least one implementation-specific condition, a first number of bytes indicative of how many bytes to simulate as being loaded from a simulated memory system in response to the load chunk instruction;

designate, as data corresponding to the at least one architecturally visible load destination register, at least a portion of data corresponding to a source block of simulated memory system locations selected based on the source address, the source block of memory system locations having a size corresponding to the first number of bytes; and designate, as data corresponding to the architecturally visible load length register, a load length value indicative of a number of bytes which is less than or equal to the first number of bytes and which is also less than or equal to a number of bytes corresponding to a total size of the at least one architecturally visible load destination register; and store chunk instruction decoding program logic to decode a store chunk instruction specifying a destination address, at least one architecturally visible store source register, and an architecturally visible store length register, and in response to the store chunk instruction to control the host data processing apparatus to:

determine, based on at least one implementation-specific condition, a second number of bytes indicative of how many bytes of data to simulate as being stored to the simulated memory system in response to the store chunk instruction;

simulate storing of data, at least a portion of which is data designated as corresponding to the at least one architecturally visible store source register, to a destination block of simulated memory system locations determined based on the destination address, the destination block of memory system locations having a size corresponding to the second number of bytes; and designate a store length value indicative of the second number of bytes as data corresponding to the architecturally visible store length register.

* * * * *